United States Patent [19]
Charlton et al.

[11] Patent Number: 5,875,354
[45] Date of Patent: Feb. 23, 1999

[54] SYSTEM FOR SYNCHRONIZATION BY MODIFYING THE RATE OF CONVERSION BY DIFFERENCE OF RATE BETWEEN FIRST CLOCK AND AUDIO CLOCK DURING A SECOND TIME PERIOD

[75] Inventors: Paul Charlton, Sunnyvale; Keith Gurganus, Cupertino, both of Calif.

[73] Assignee: Apple Computer, Inc., Cupertino, Calif.

[21] Appl. No.: 609,395

[22] Filed: Mar. 1, 1996

[51] Int. Cl.$^6$ ..................................................... G06F 9/00
[52] U.S. Cl. ........................... 395/881; 395/551; 395/553
[58] Field of Search ................................. 395/806, 551, 395/881, 553

[56] References Cited

U.S. PATENT DOCUMENTS

| | | | |
|---|---|---|---|
| 5,430,485 | 7/1995 | Lankford et al. | 348/423 |
| 5,452,435 | 9/1995 | Malouf et al. | 395/550 |
| 5,581,748 | 12/1996 | Anderson | 395/557 |
| 5,661,728 | 8/1997 | Finotello et al. | 370/503 |
| 5,664,044 | 9/1997 | Ware | 386/75 |

*Primary Examiner*—Thomas C. Lee
*Assistant Examiner*—Anderson I. Chen
*Attorney, Agent, or Firm*—Blakely, Sokoloff, Taylor & Zafman

[57] ABSTRACT

A method and apparatus for synchronizing the presentation of time dependent data to a first dock having a first frequency is disclosed. First, a rate conversion is performed on a data stream for a first time period. Second, the rate of conversion is modified to provide a modified rate of conversion. Third, a rate of conversion having a modified rate of conversion is performed on the data stream for a second time period. The second and third steps are repeated until all samples in the data stream are presented. The rate of conversion is modified from one period to the next based on a measurement of the difference between a rate for the first clock and the rate of a second less precise clock.

39 Claims, 17 Drawing Sheets

SYSTEM FOR SYNCHRONIZATION BY MODIFYING THE RATE OF CONVERSION BY DIFFERENCE OF RATE BETWEEN FIRST CLOCK AND AUDIO CLOCK DURING A SECOND TIME PERIOD

BACKGROUND OF THE INVENTION

1. Field of the Invention

The present invention relates to the field of information presentation in a data processing system. More particularly, the present invention relates to a method and apparatus for synchronizing the presentation of media (i.e., time dependent data) to an arbitrary time reference in a data processing system.

2. Art Background

Computer systems and more generally data processing systems that utilize time dependent data, such as audio data or video data, to produce a time dependent presentation require a synchronization mechanism to synchronize the processing and display of time dependent data. Without synchronization, time dependent data cannot be retrieved, processed, and used at the appropriate time. As a result, the time dependent presentation would have a discontinuity due to the unavailability of the data. In the case of video data, there is typically a sequence of images ("frames") which, when the images are displayed in rapid sequence (e.g., each frame being displayed for 1/30th of a second immediately after displaying a prior frame), creates the impression of a motion picture. The human eye is particularly sensitive to discontinuities in a motion picture. With the video images, the discontinuity would manifest itself as a stutter in the video image or a freeze-up (e.g., a single frame being displayed considerably longer than 1/30th of a second) in the video image. With audio presentations, this discontinuity would manifest itself as a period of silence, a pause, clicks, or stuttering.

FIG. 1A illustrates one prior technique of synchronizing digital audio information (i.e. samples) with digital video information (i.e. samples) is to make the audio clock the master clock and to slave the digital video information to this audio clock. This approach is employed by Microsoft in Windows 3.1, Video for Windows, and by IBM in MMPM for OS/2. In this approach, the audio dock of the sound subsystem (e.g., a Sound Blaster card) is the master clock to which digital audio samples and digital video samples are synchronized. This audio clock determines the rate at which the digital audio samples are sent to a digital to analog converter (DAC), and subsequently, played back through a transducer (e.g., speaker). This audio clock is also used to synchronize the digital video information (i.e., the timing of the frames of video).

Specifically, this approach employs a buffer 2 for receiving audio samples 4 and providing a sample count 6. The sample count 6 is simply the number of samples sent from the buffer 2 to the digital to analog D/A converter 8. The D/A converter 8 receives the samples from the buffer 2 and provides the samples to a transducer 12 (e.g., a speaker). The D/A converter 8 has an input for receiving an audio clock 10.

A graphics controller 14 that processes a video stream of samples is coupled to the buffer 2. The graphics controller 14 has a first input for receiving video samples 16, and a second input for receiving the sample count 6 from buffer 2. The graphics controller 14 provides the video samples 16 to a display 18 at a rate determined indirectly, by determining the sample count (i.e., ($\Delta T \times Rate$) modulo 2048).

Synchronizing both the digital audio and video information to the audio clock has several disadvantages. First, because the audio clock is typically generated by a low quality, low precision oscillator, the audio clock does not stay in synchronization with real time. Being out of synchronization with real time causes two distinct problems. First, with respect to audio information, being out of synchronization with real time causes the pitch of a sound to be different from the desired and true frequency or tone. Second, in an environment where one workstation is sending time dependent information to another workstation, video and audio continuity and quality are compromised when the video and audio information are not synchronized to a high-quality, high precision clocks. For example, workstation A may be sending samples at a first frequency (rate of transmission) dependent on the audio clock, disposed in workstation A, and workstation B may be presenting these samples at a rate of reception dependent on the audio clock of workstation B. If the frequency of the audio clock of workstation A is different by any amount from the audio clock of workstation B, a delay or overload of information occurs causing buffering issues (too much information) or static/noise (too little information).

Moreover, a second disadvantage of utilizing the audio clock as the master dock for synchronization purposes, is that one cannot directly read the audio clock in the sound subsystem. For example, in the Soundblaster card, although one can observe how many samples are currently queued in the FIFO (i.e., a FIFO buffer flag indicates the number of samples in the buffer), one is not provided the number of samples played through the D/A converter to the speakers. When one cannot read the audio clock and when one is only provided with the status of the FIFO buffer, an error is injected into the system with respect to the actual number of samples played already (e.g. resolution of the data). For example, if the data is at 22KHz, stereo, and the buffer is 16 bits in size, 2K over 88K equals approximately 1/40th of a second. This is the granularity or error of estimating how many samples have been played through the DAC to the speakers by using a sample count from the buffer (i.e., an approximation error of the exact audio playback time). Because the video information is slaved to the audio sample count, this error affects the synchronization of the video samples, as well.

The Windows 3.1, Video for Windows, approach is not interrupt driven and essentially performs the following sequence of steps. First, the program reads an audio count (i.e., the audio frame number). Next, it determines if the audio count is far along enough for the next video frame. If so, it processes or draws the next video frame. In this prior art scheme, the video information always comes at times, approximate to the audio information and so is properly synchronized with the audio information. However, at lower audio rates, the video information is jerky (e.g., a stuttering video) due to the error in the sample count.

FIG. 1B illustrates a graph of the audio clock versus the real time clock for the prior art approach discussed above. It is clear that the prior art demonstrates a low resolution timebase and drift with respect to real time. For example, compare the Real Time line with the Implied Time line. The height of each step of the Implied Time line is simply the size of the FIFO buffer. For example, with a 2K FIFO buffer, the granularity may be calculated using the expression (number of bytes–(number of bytes modulo 2048)).

FIG. 2A illustrates an alternative prior art approach to synchronizing digital audio samples with digital video samples. The improvement of this approach over the approach, illustrated in FIG. 1A is a reduction of the 2K FIFO buffer granularity discussed previously. This approach employs a sample count estimation unit 24 for reducing the granularity. The sample count estimation unit 24 has a first input for receiving the sample count 6 from buffer 2, a second input for receiving a dock 26 that has a greater precision than the audio clock 10, and a third input for receiving a programmed audio rate. For example, clock 26 may be the real time clock of the computer system. The sample count estimation unit 24 based on these inputs, generates an estimated sample count 28 and provides this count 28 to the graphics controller 14.

The sample count estimation unit 24 is responsible for performing the following. First, the sample count 6 is recorded at buffer 2 with a high precision time (provided by the second clock 26) to provide a baseline for the subsequent measurements. Second, the time elapsed since the buffer 2 was last filled is calculated. Third, this elapsed time is multiplied by the sample rate of the audio dock 10 (interpolation step). The result of this calculation is added to the number of samples recorded in the baseline record. Accordingly, the present invention provides an estimate of the sample count played through the D/A converter at any given time.

This prior art technique attempts to eliminate the 2K FIFO buffer granularity in the audio subsystem of the first approach by recording the time at which the FIFO buffer is filled with a sample, and the number of samples stored in the FIFO at that time. This time stamping is accomplished by another higher resolution clock (e.g., a real time system dock). This prior art approach gives the number of samples at any given time. By measuring the elapsed time since the FIFO buffer was filled and multiplying the elapsed time with the audio rate of the samples and adding the number of samples present at an initial time, this prior art technique estimates the number of samples played back through the DAC.

The following steps are employed by this prior art technique. First, a reference sample count is recorded at a first time. Then, additional audio samples are queued. Second, the sample count is recorded, along with the time via a high precision clock (time stamp). The audio information is synchronized by 1) the reading of the high precision time, subtracting the FIFO buffer time stamp, 2) multiplying this difference by the audio rate, 3) and adding the audio FIFO buffer counter to the audio reference sample count.

The term samples is used to denote one or more digital samples of data. These samples may be represented by a digital value having different sizes (e.g., bytes, words, etc.).

FIG. 2B illustrates a graph of the audio clock versus the real time dock for this second prior art approach. Although demonstrating finer granularity synchronization, it still has drift with respect to real time. For example, compare Implied Time line with Real Time line. Although better than the first prior art approach in that it reduces the granularity via interpolation and better approximates the ideal one-to-one correspondence between the audio master time and the real time, this second prior art approach has several disadvantages.

For example, this second prior art approach still synchronizes the video sample to the audio clock, which is not a high precision clock. Thus, the other problems noted above with respect to an imprecise audio clock (i.e., pitch and queuing problems) still exist in this approach.

An alternative way to synchronize video data and audio data is to insure that the audio clock and the real time clock never get out of phase (i.e., are always synchronized). For example, in Macintosh computers, although the audio information was slaved to one clock, and the video information was slaved to another clock, these two docks were very precise in that they were manufactured in such a way that they never got out of phase. Thus, this approach, controls the manufacturing process of the audio and real time clocks (RTCs) to synchronize both the audio and video information. This approach is costly and highly process dependent. For example, for this approach to be effective, generally one manufacturer must provide both audio capabilities, and the real time clock (RTC), and that manufacturer must use the high accuracy manufacturing process on both oscillator parts to ensure synchronization. Moreover, this technique is not conducive for a user to expand the audio capabilities of a computer system with audio cards from other manufacturers.

FIG. 3 illustrates yet another alternative prior art approach to synchronizing digital audio samples to digital video samples. This technique is employed by the Assignee of the present invention in Quicktime for Windows version 1.1. In this approach, a rate conversion unit 30 having a first input for receiving samples audio samples 32. The rate conversion unit 30 includes a second input for receiving a second clock rate 50, hereinafter described. The rate conversion unit 30 has an output for generating samples at a second clock rate 36. The samples at the second clock rate 36 are provided to the D/A converter 8.

The D/A converter 8 has an input for receiving a second clock rate 38, generated by a second oscillator 40 ($\emptyset_2$) This oscillator is programmed by a program value 42.

Typically, a user may select from a limited number of frequencies and program the oscillator 40 with a desired frequency. However, the actual frequency generated by the oscillator 40 is not identical to the programmed desired frequency. Thus, the discrepancy between the desired programmed frequency value 42 and the actual second clock rate 38 is one source of synchronization errors in the system.

This prior art approach employs a database 46 that is coupled to the rate conversion unit 30 to provide a second clock rate 50 to that rate conversion unit 30. The database 46 includes an input for receiving various hardware configuration parameters 48, and an input for receiving a programmed value 42 (i.e., a user programmed value for the audio clock). The database includes a second clock rate 50 (the best approximation of the actual frequency of the audio clock) for different sets of specific hardware configuration parameters 48 and different programmed values 42. Upon initialization, a user, or computer system, provides the database with its required inputs, and the database generates a second clock rate 50 (i.e., the best approximation of the audio dock frequency). In response to these inputs, the database generates the conversion rate 50. The hardware configuration parameters 48 specify the particular hardware and software components of the computer system. The second clock rate 50 is a predicted frequency of the second clock corresponding to a particular programmed value 42, selected by the user, and the hardware configuration parameters 48. The rate conversion unit 30 uses the same second clock rate 50 thereafter during playback. The first oscillator 35 generates a first clock frequency 34, which is used to time presentation of video information and other types of media information (not shown). The first clock may be the real time clock of the computer system.

This approach has several disadvantages. First, if a database does not contain a second clock rate ($\emptyset_2$) corresponding to a known hardware configuration (e.g., a new sound card employing a new oscillator), the rate conversion unit 30 is not necessarily provided with a second clock rate 50 that approximates the actual frequency of the second clock rate. Second, with the advent of clocks being implemented with simple resister-capacitor circuits (RC circuits) that generate frequencies susceptible to temperature fluctuations of the circuit (i.e., the frequency of these RC clocks vary as a function of temperature), this approach cannot compensate or adjust for clocks having a dependence on environmental factors.

Accordingly, a method and apparatus of synchronizing the presentation of audio, video, and other media information is desired based upon an arbitrary external reference.

SUMMARY OF THE INVENTION

A method and apparatus for synchronizing the presentation of a stream of time dependent data to a first clock having a first frequency is disclosed. First, a rate conversion is performed on the data stream for a first time period. Second, the rate of conversion is modified to generate a modified rate of conversion. Third, a rate conversion having the modified rate of conversion is performed on the data stream for a second period of time. The second and third steps are repeated until all samples in the data stream are presented. The rate of conversion is modified based on a measurement of the difference between a rate of the first clock and a rate of a second less precise clock and latency errors introduced by previous inaccuracies in a second clock rate.

In one embodiment, the first clock is a real time clock of a computer system, typically provided by an oscillator chip located on the motherboard/baseboard. The second clock is an audio clock, which is part of an audio subsystem, which may be implemented as an add-in card to a computer system. The present invention synchronizes a data stream, having a plurality of samples (e.g., audio and video information) by performing a rate conversion on the data stream. The present invention modifies the rate of conversion applied to the data stream based on the measurement of a difference between the rate for the real time clock and the rate of the presentation clock.

In an alternative embodiment, the present invention includes a first logic circuit for receiving the data stream and for performing rate conversion on the data stream having a plurality of samples. A second logic circuit includes an input for receiving a first frequency (e.g., the frequency of a real time clock of the computer system). The second logic circuit is coupled to the first logic circuit and the data buffer. The second logic circuit receives a value from the data buffer that is an estimate of the number of samples presented (e.g., audio played back through a sampler digital-to-analog converter (DAC)). Based upon this value, the second logic circuit generates a modified rate of conversion that synchronizes the data values in the data stream to the real time clock. The data buffer is coupled to a digital to analog converter that converts the digital data values into analog values and presents these values to the user via a transducer (e.g., speaker) at an independent second clock rate (e.g., the audio clock frequency).

BRIEF DESCRIPTION OF DRAWINGS

The present invention is illustrated by way of example and not limitation in the figures of the accompanying drawings in which like references indicate similar elements.

DETAILED DESCRIPTION OF THE INVENTION

Figure 1A:
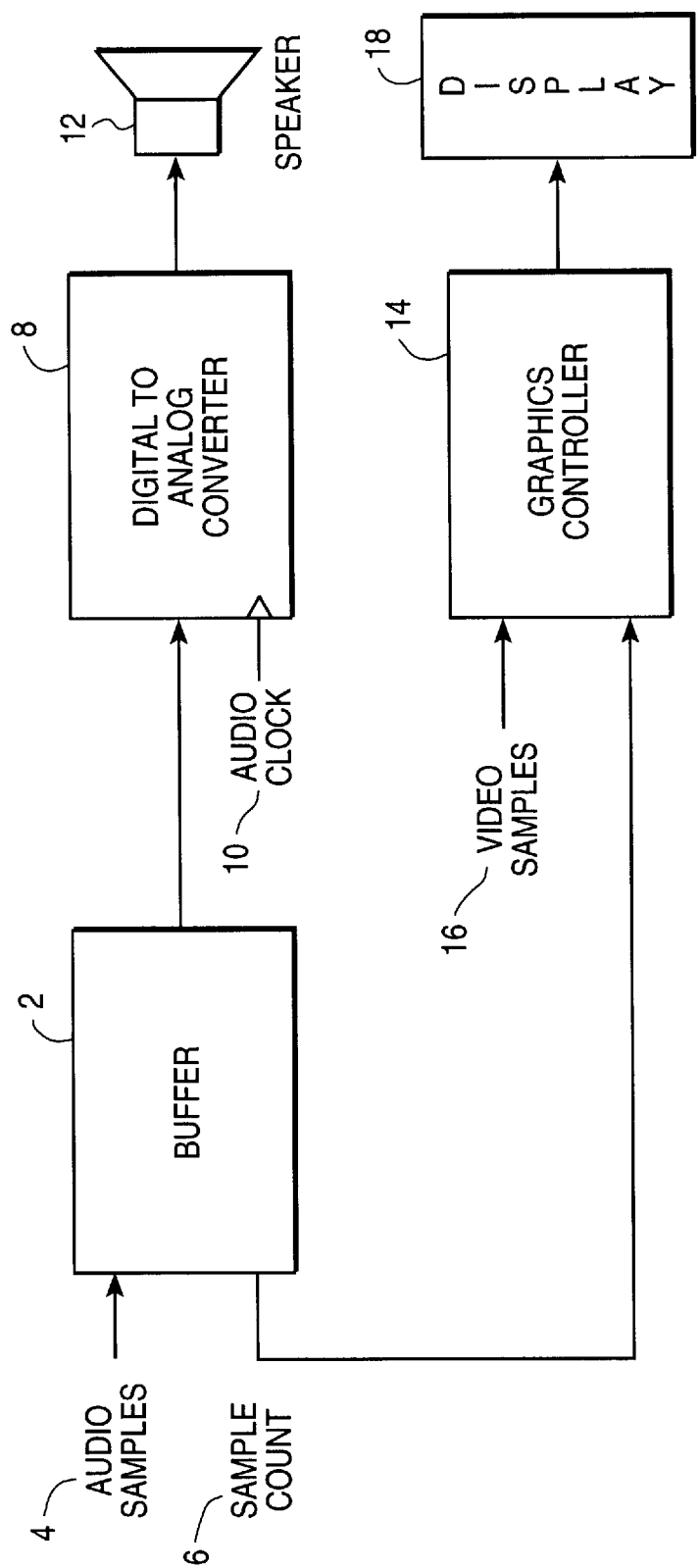
FIG. 1A illustrates a prior art technique that synchronizes the presentation of time dependent information to an audio clock of a computer system.
Figure 1B:
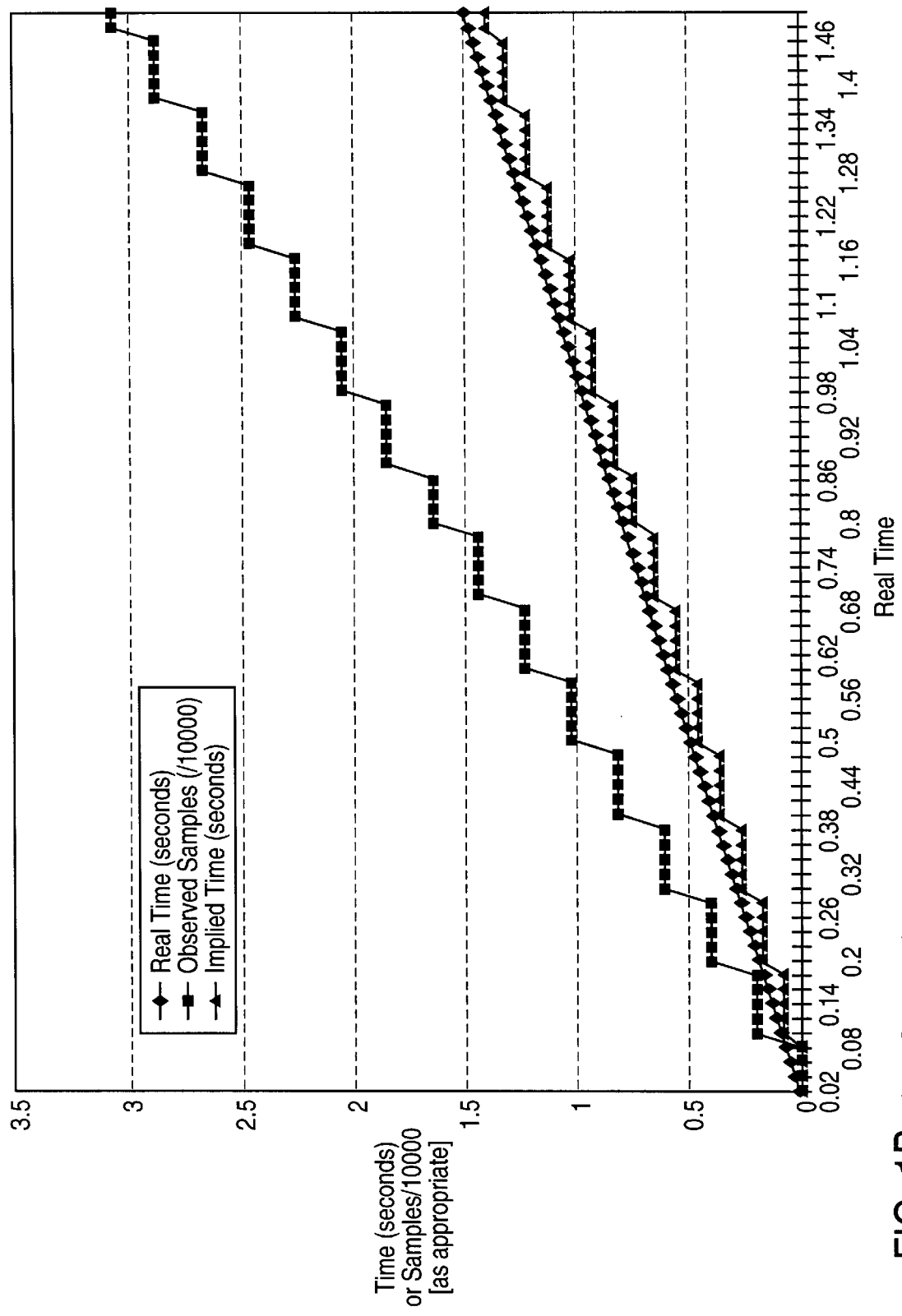
FIG. 1B illustrates a graph of the audio clock versus the real time clock for this prior art approach.
Figure 2A:
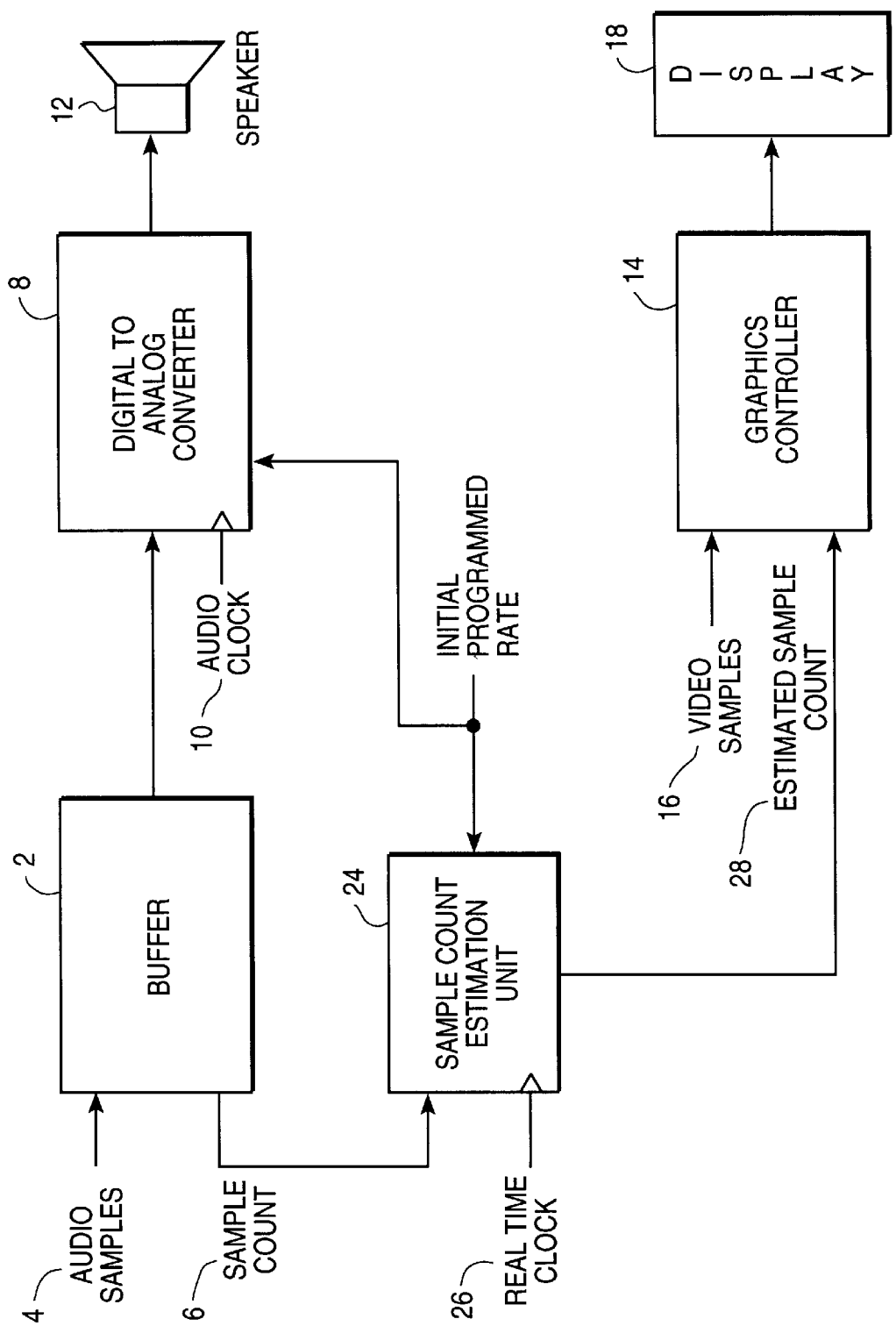
FIG. 2A illustrates an alternative prior art technique that synchronizes the presentation of time dependent information to an audio clock, employing an interpolated sample count derived through the use of time stamps and more precise clock.
Figure 2B:
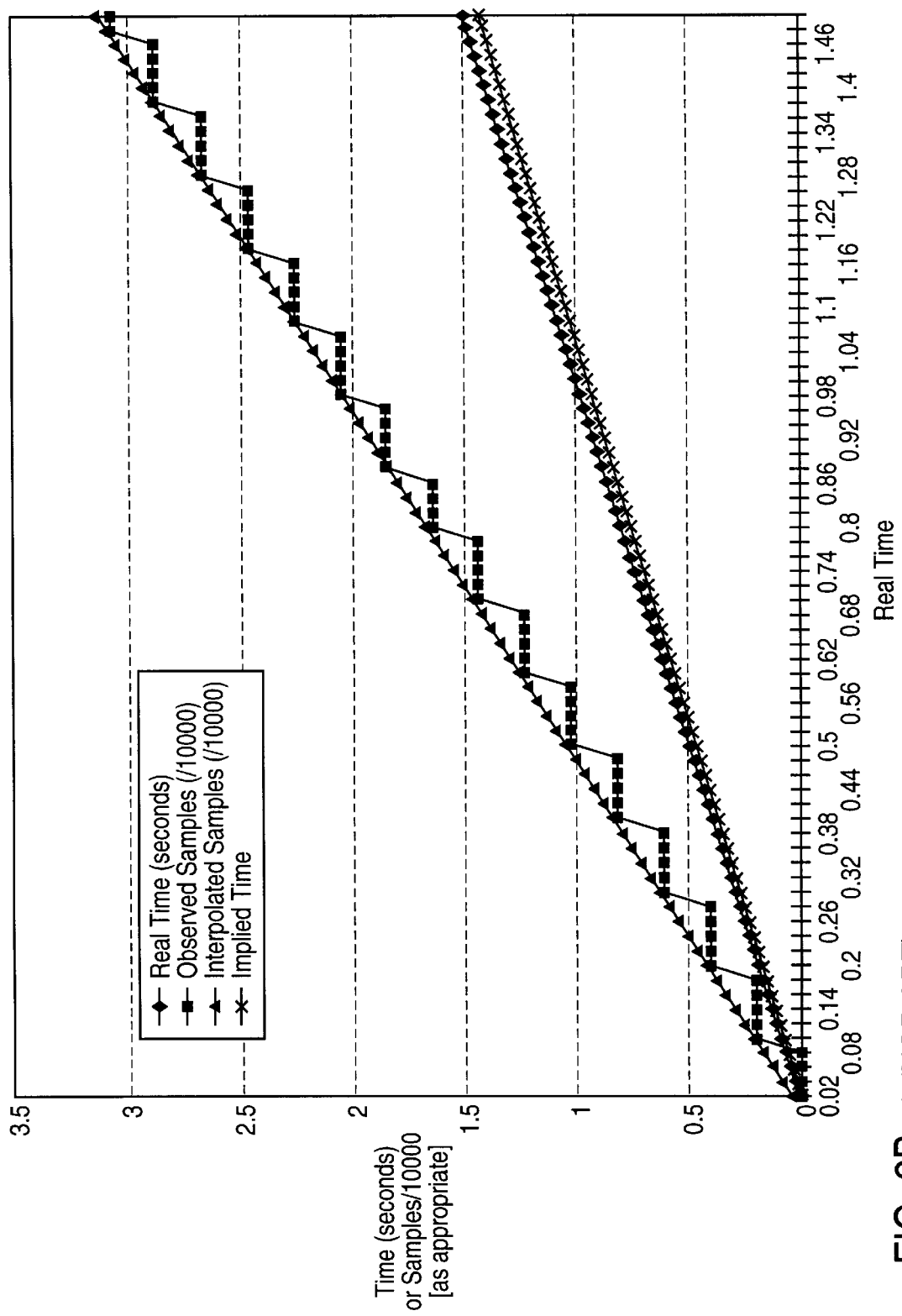
FIG. 2B illustrates a graph of the audio clock versus the real time clock for this prior art approach.
Figure 3:
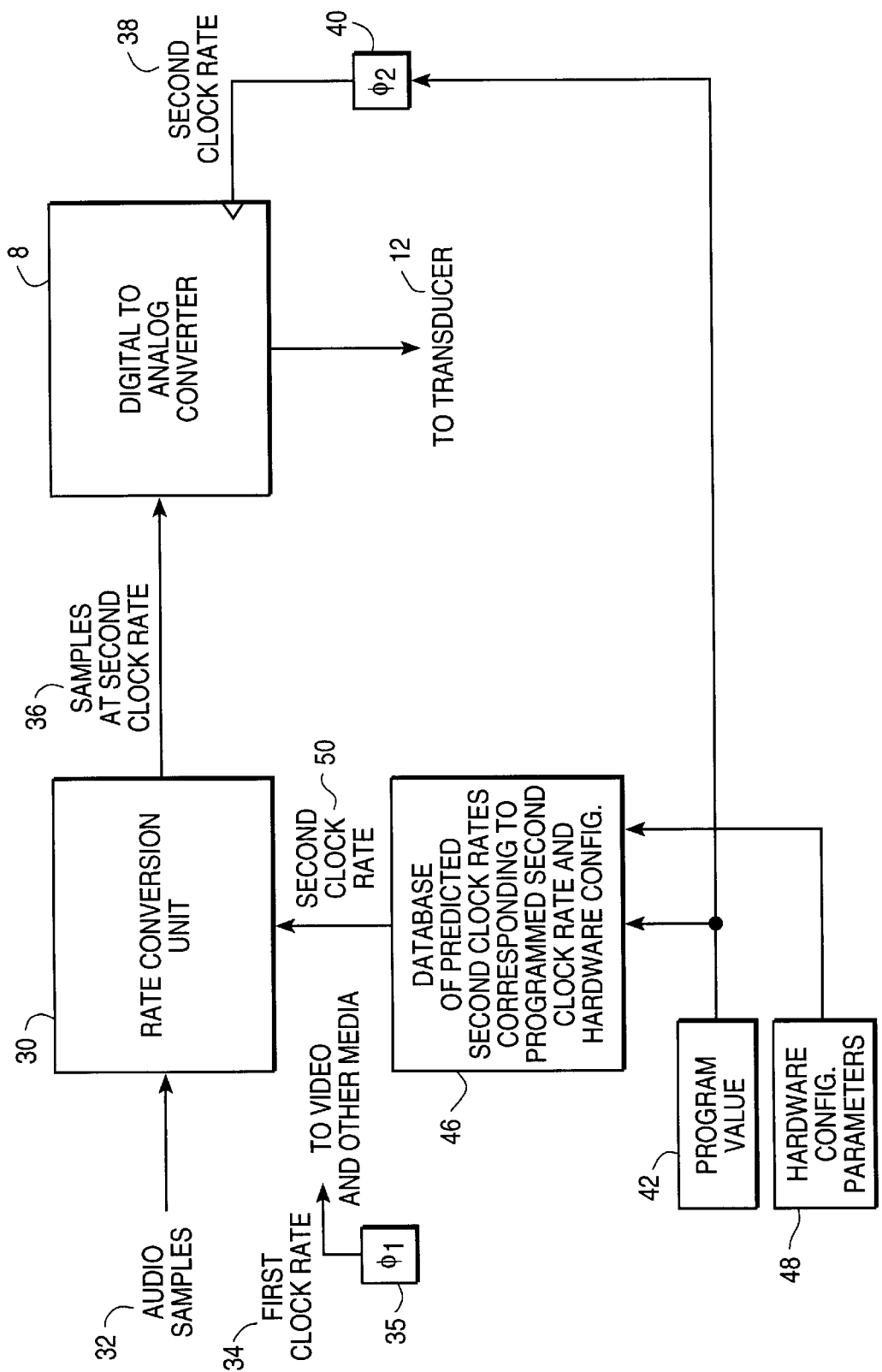
FIG. 3 illustrates an alternative prior art technique that synchronizes the presentation of media information to a real time clock of a computer system, and that synchronizes the presentation of audio information to a real time clock of a computer system when the audio samples are clocked using an audio clock.

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail in order to not obscure aspects of the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these qualities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a method and apparatus for synchronizing the presentation of media to an arbitrary time reference. Media may include audio information, video information, text information or music information, among others. The present invention may be employed to synchronize the presentation of a single, particular media to an arbitrary clock. Furthermore, the present invention may also be employed to synchronize the presentation of a plurality of media independently from each other to the same arbitrary clock (e.g., real time clock). Moreover, the present invention may be employed to synchronize of the presentation of mixed media (e.g., a data stream having a mixture of audio, video, text, music, etc.).

Figure 4:
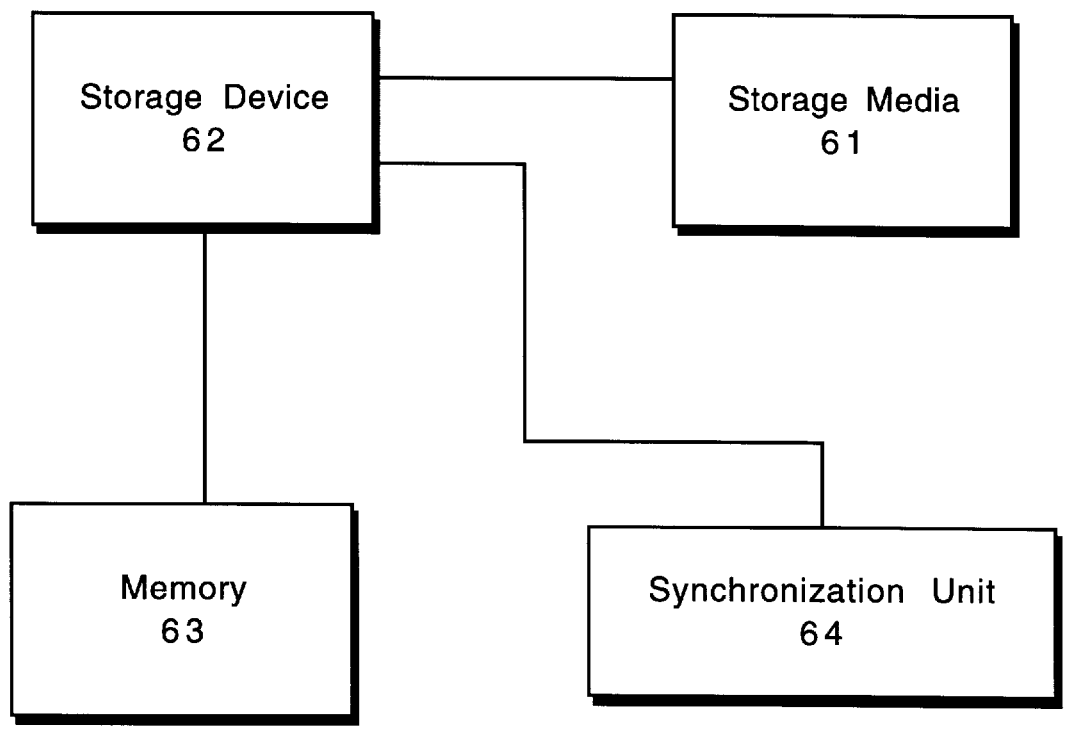
FIG. 4 illustrates, in block diagram form, an embodiment of the apparatus of the present invention.

FIG. 4 illustrates in block diagram form an apparatus for synchronizing data presentation in accordance with one embodiment of the present invention. Apparatus 60 comprises storage media 61, storage device 62, memory 63 and synchronization unit 64. Storage media 61 is coupled to storage device 62, and storage control device 62 is coupled to memory 63. Storage control device 62 is also coupled to synchronization unit 64. Storage media 61 can comprise a floppy disk, a hard disk, a compact disk or other storage media. Storage media 61 stores data. The data can be video data, audio data or other forms of data. Storage control device 62 can comprise a floppy disk drive controller, hard disk drive controller, CD-ROM drive controller or other input/output controllers for storage devices. Storage control device 62 retrieves data from storage media 61. The data retrieved by storage control device 62 can be transferred to memory 63. Memory 63 can comprise a static random access memory (SRAM), dynamic random access memory (DRAM), cache memory or other memory device. Memory 63 stores the data transferred from storage device 62. This data may be stored in a frame buffer, which may be part of memory 63. Synchronization unit 64 can comprise an Application Specific Integrated Circuit (ASIC) component, logic circuitry, or a general purpose microprocessor and operating under control of software instructions. The synchronization unit 64 synchronizes the presentation of data from a source such as storage media 61 to a real time clock.

Figure 5:
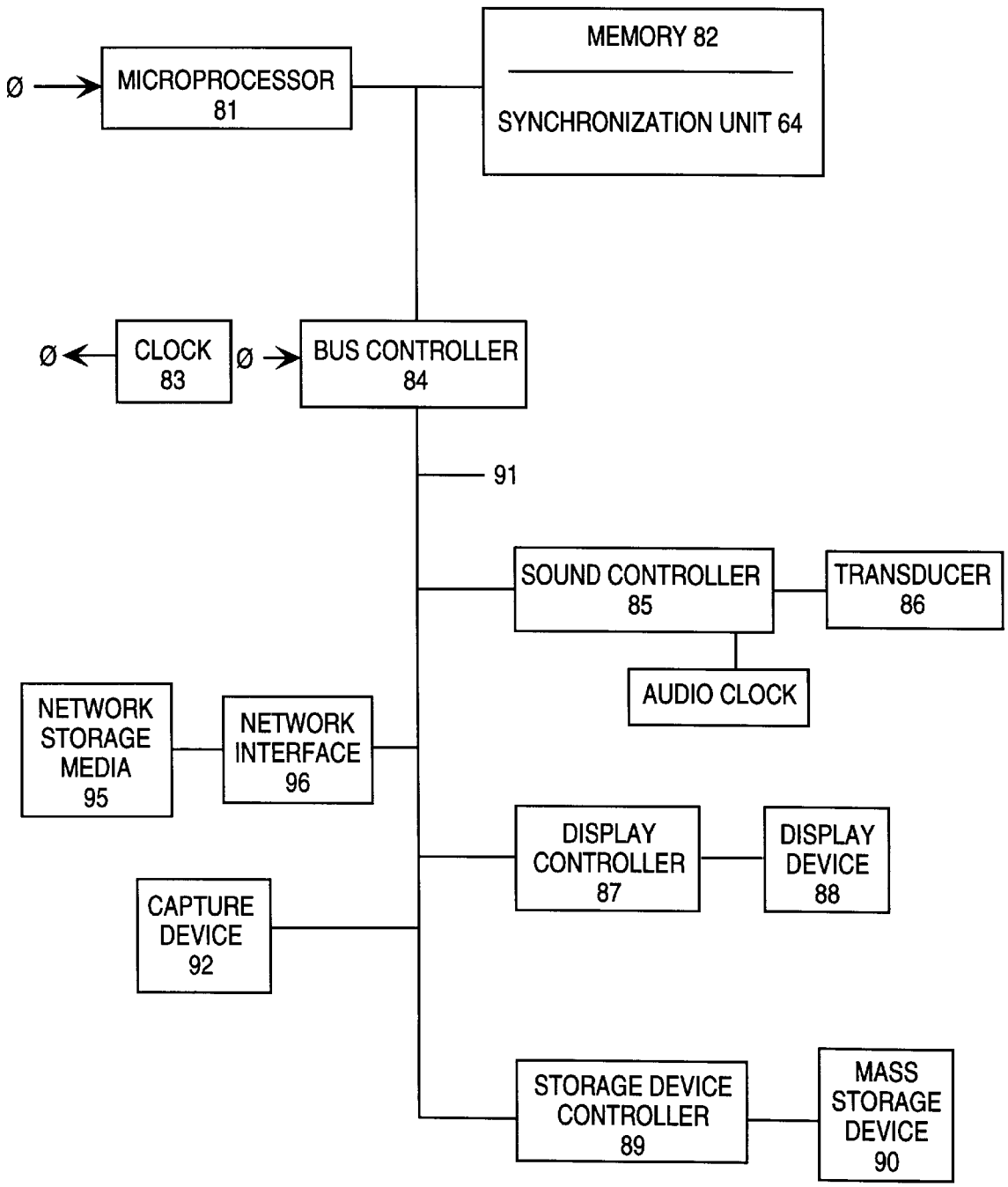
FIG. 5 illustrates a block diagram of a typical computer system in which the present invention may be implemented.

FIG. 5 illustrates in block diagram for a typical computer system of an alternative embodiment of the present invention. Computer system 80 comprises microprocessor 81, memory 82, clock generator 83, bus controller 84, sound controller 85, sound transducer 86, display controller 87, display device 88, storage device controller 89, mass storage device 90 and bus 91. Microprocessor 81 is coupled to clock generator 83. Microprocessor 81 is also coupled to memory 82 and bus controller 84 by bus 91. Memory 82 is coupled to bus controller 84 by bus 91. Bus controller 84 is coupled to clock generator 83 (e.g., real time clock) to receive the clock signal "Ø". Bus controller 84 is also coupled to sound controller 85, display controller 87 and storage device controller 89 by bus 91. Sound controller 85 is coupled to sound transducer 86 which may, for example, be a conventional speaker. Sound controller 85 includes an input for receiving an audio clock. Display controller 87 is coupled to display device 88. Storage device controller 89 is coupled to mass storage device 90. Capture device 92 is coupled to the computer system via bus 91. The capture device 92 is any device for capturing media and providing it to the computer system. For example, capture device 92 may be a microphone for capturing audio information or a camcorder for capturing video information.

Processor 81 can be a complex instruction set computing (CISC) microprocessor, reduced instruction set computing (RISC) microprocessor, very long instruction word (VLIW) or other processor device. Processor 81 executes instructions or code stored in memory 82 and performs operations on audio data, video data or other data stored in memory 82 or, after retrieval, data from mass storage device 90.

Figure 7:
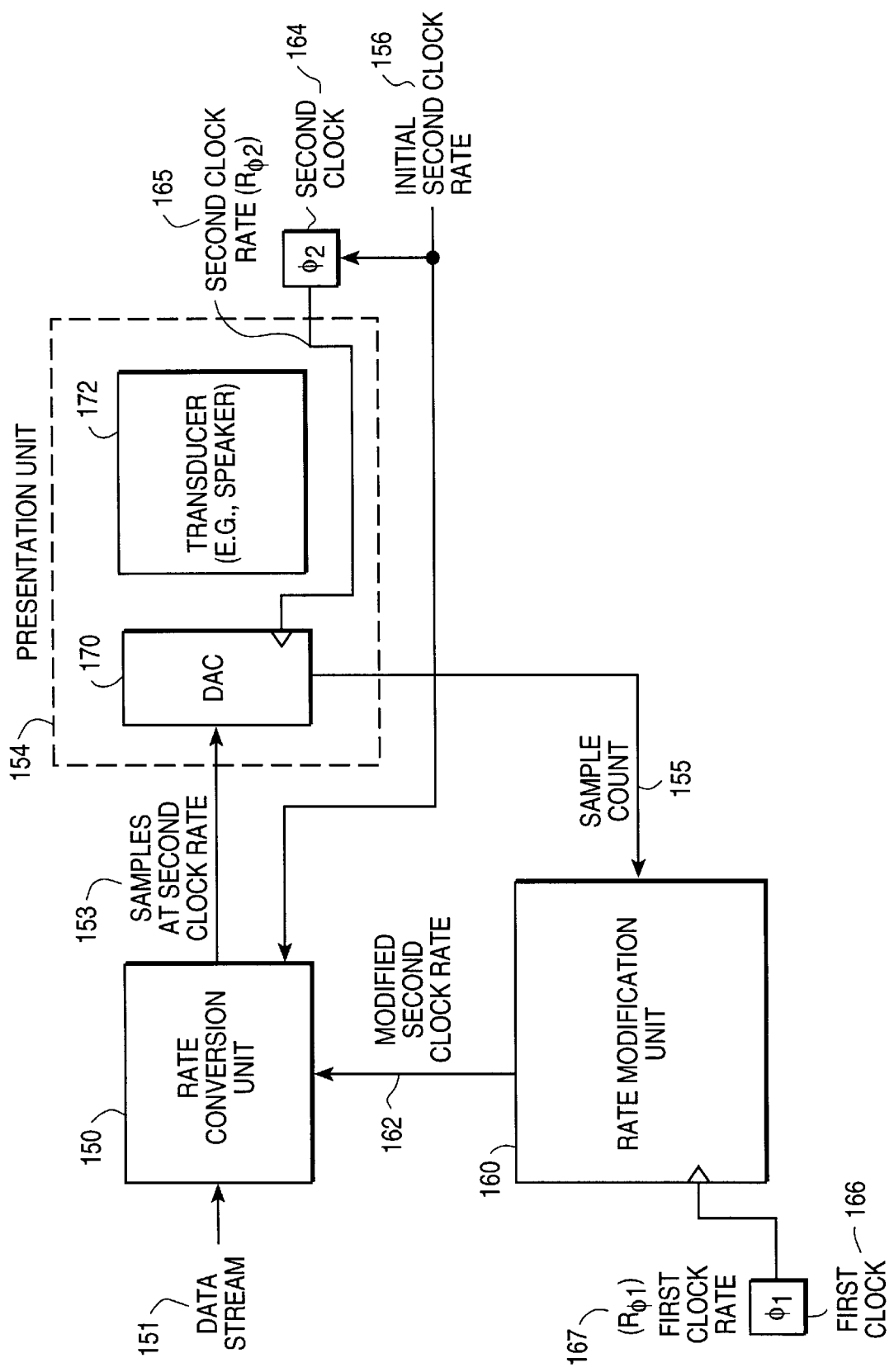
FIG. 7 illustrates a block diagram of one embodiment of the present invention.
Figure 11:
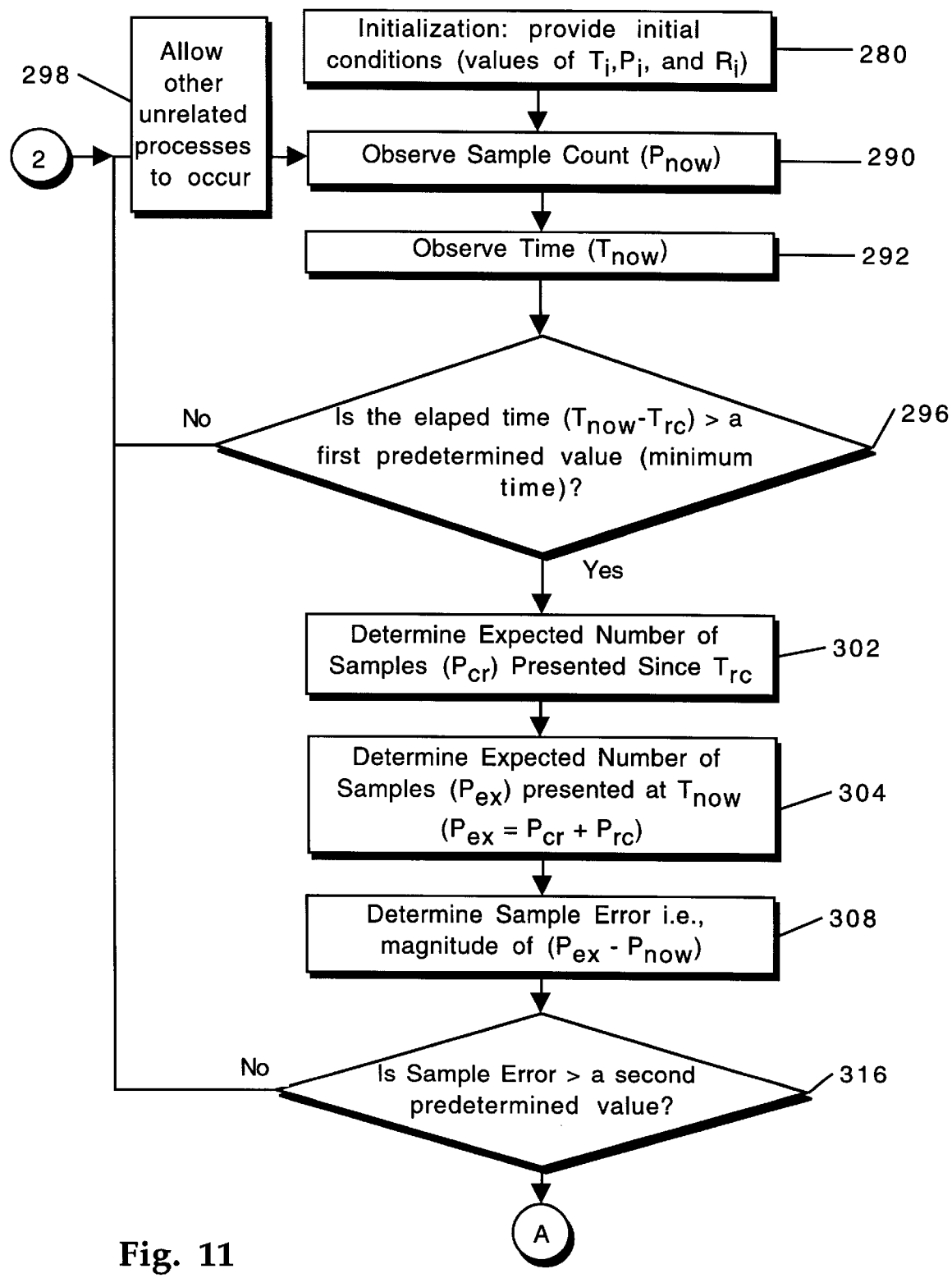
FIG. 11, 12, and 13 are flow charts showing an embodiment of a method according to the present invention.
Figure 12:
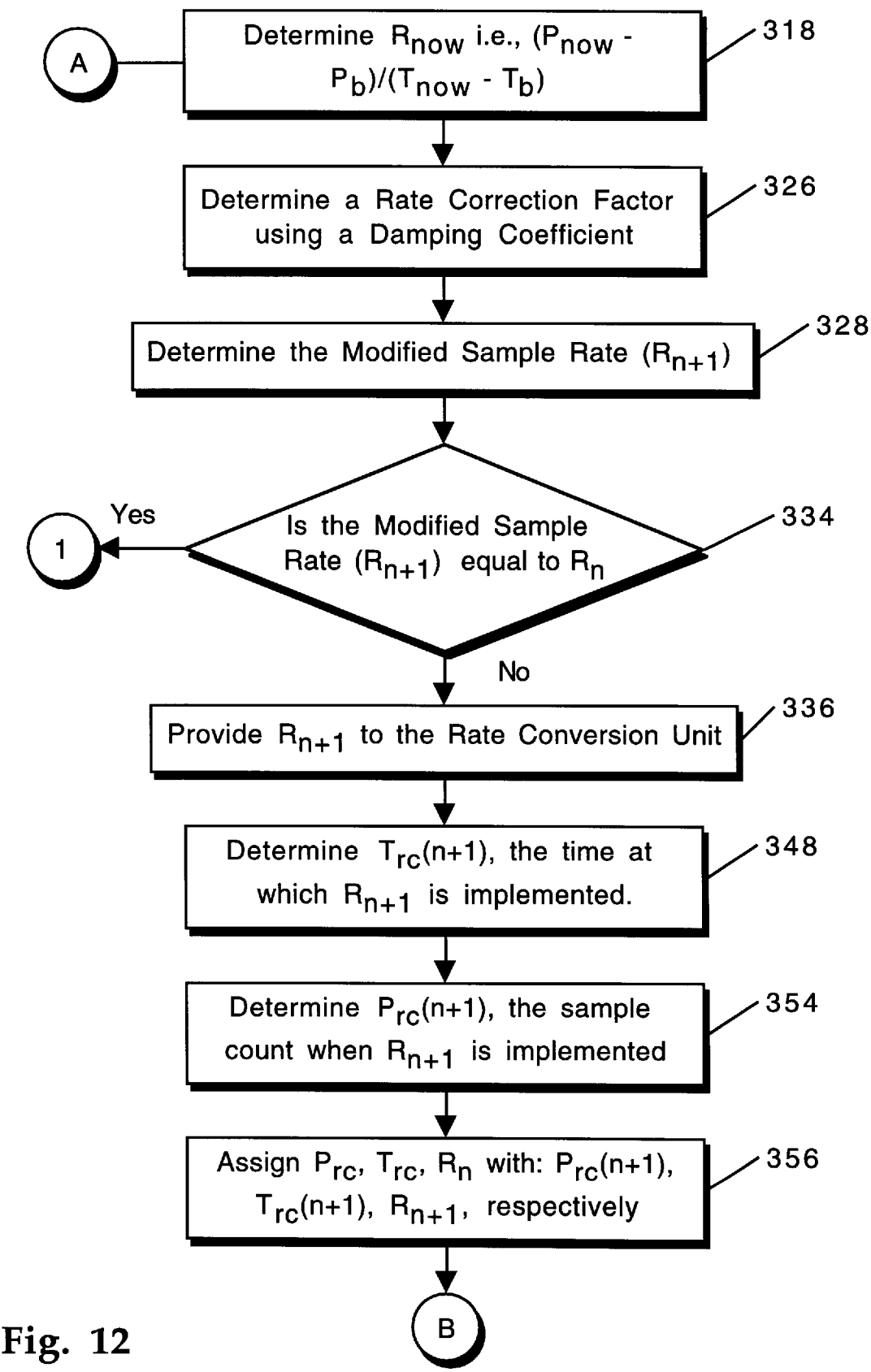
Figure 13:
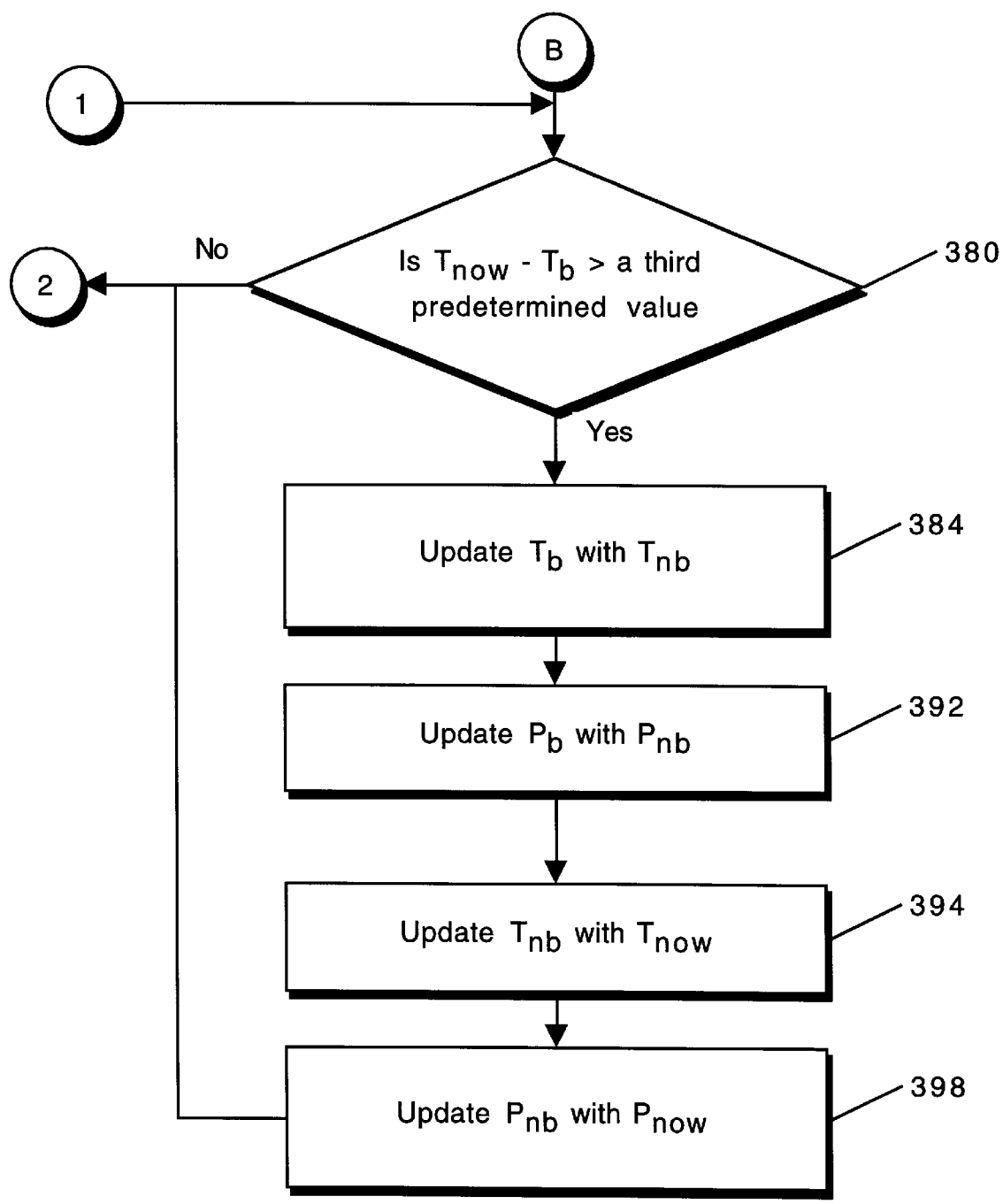
Figure 15:
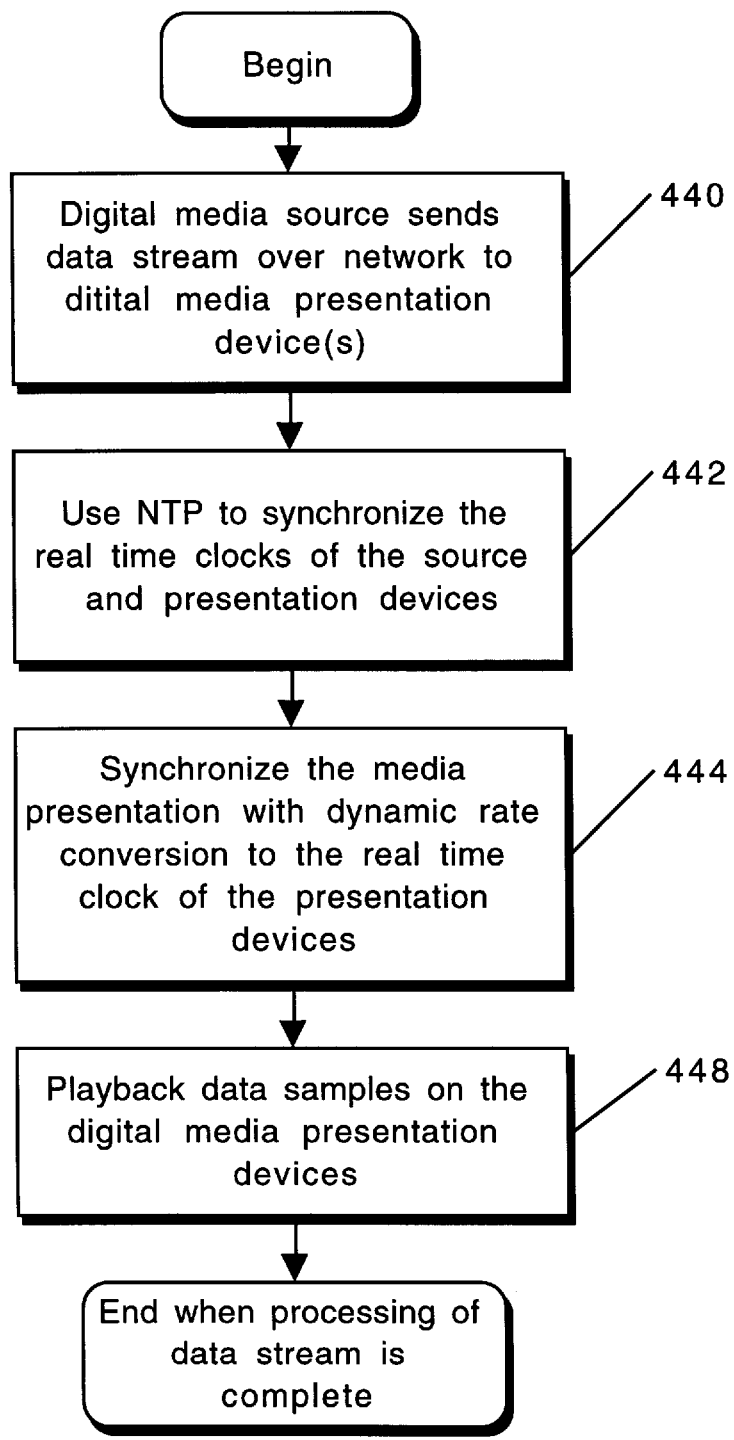
FIG. 15 is a flow chart showing an embodiment of the method of the present invention implemented in a network, such as the one shown in FIG. 14.

Memory 82 can be a dynamic random access memory (DRAM), static random access memory (SRAM), cache memory or other memory device. Memory 82 can store instructions or code that are part of application programs, operating system programs or other computer programs. Memory 82 can also store audio data, video data or other forms of data. Memory 82 can transfer instructions or code that make up application programs, operating system programs or other computer programs to processor 81. Memory 82 can also transfer audio data, video data or other forms of data to processor 81. Memory 82 stores a first plurality of processor executable instructions, a second plurality of processor executable instructions, a third plurality of processor executable instructions, a fourth plurality of processor executable instructions and a fifth plurality of processor executable instructions. Synchronization unit 64 includes the first plurality of processor executable instructions which is executed by processor 81 in the manner shown in FIG. 9. The embodiment of the present invention, as shown in FIGS. 11–13 comprises the second plurality of processor executable instructions which is executed by processor 81 in the manner shown in FIGS. 11–13. The embodiment of the present invention, as shown in FIG. 15, comprises the third plurality of processor executable instructions which is executed by processor 81 in the manner shown in FIG. 15. The embodiment of the present invention, as shown in FIG. 7, comprises the fourth plurality of processor executable instructions stored in memory 82, which is executed by processor 81. The embodiment, illustrated in FIG. 8, includes the fifth plurality of processor executable instructions stored in memory 82, which is executed by processor 81.

Clock generator 83 can comprise a 25 megahertz oscillator, 33 megahertz oscillator, 50 megahertz oscillator, 66 megahertz oscillator, 75 megahertz oscillator, 90 megahertz oscillator, 100 megahertz oscillator or other oscillator device. Clock generator 83 provides a clock signal "Ø" (e.g., real time clock) to processor 81 and bus controller 84. Bus controller 84 can be a conventional, commercially available parallel bus controller. Bus controller 84 controls transmissions on bus 91. Sound controller 85 can be a conventional sound controller and acts as an interface between sound transducer 86 and processor 81. Transducer 86 can be a speaker or other sound producing device. Transducer 86 transforms electrical signals from sound controller 85 into sound. Display controller 87 can be a conventional display adapter or other display controllers. Display controller 87 acts as an interface between display device 88 and processor 81. In this embodiment, the synchronization unit 64 synchronizes the playback of information (i.e., the presentation) to the real time clock. The information (samples) may be retrieved from mass storage device 90. Processor 81 may retrieve the data (samples) from mass storage device 90 (which typically includes a storage media such as a magnetic hard disk or an optical CD-ROM or other optical CD). Processor 81 stores the retrieved data from mass storage device 90 into memory 82. Processor 81 then processes the data from memory 82. This processing typically includes reading the data out to display device 88. The present invention synchronizes the presentation of this data to the real time clock.

Figure 6:
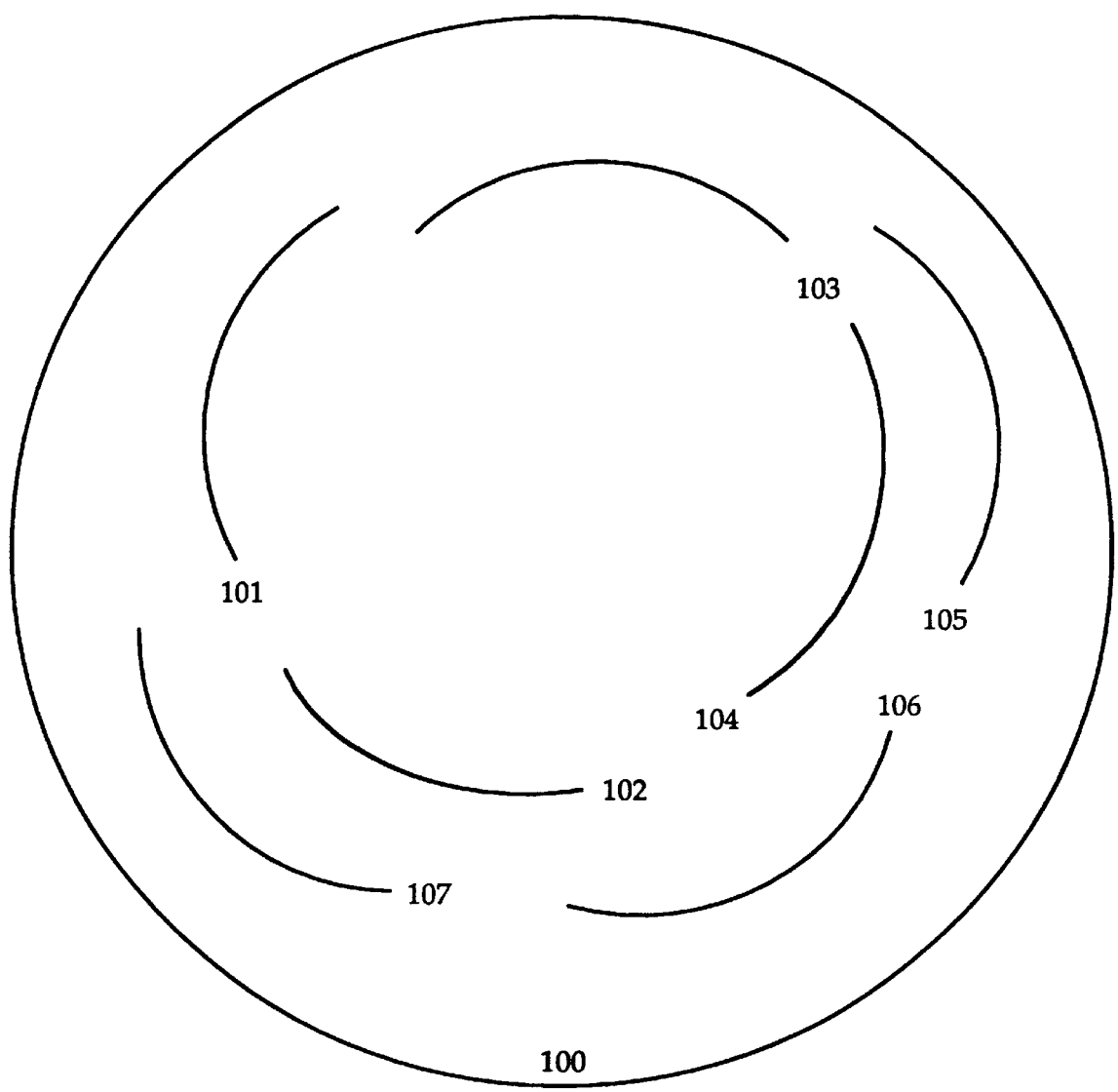
FIGS. 6 illustrates a storage media storing computer instructions for implementing the invention on a typical computer system.

FIG. 6 illustrates in a diagram form a storage media of an alternative embodiment of the present invention. Storage media 100 can be a floppy disk, hard disk, a compact disk (e.g. optical CD) or other storage media such as a network storage media 95 accessed through a computer network and a network interface 96 (e.g. a local area network or wide-area network). Storage media 100 comprises instructions 101, instructions 102, instructions 103, instructions 104, and instructions 105. The arrangement of instructions in FIG. 6 are for illustration purposes only. It will be appreciated that the instructions can be arranged in any order and in any location on storage media 100.

Figure 8:
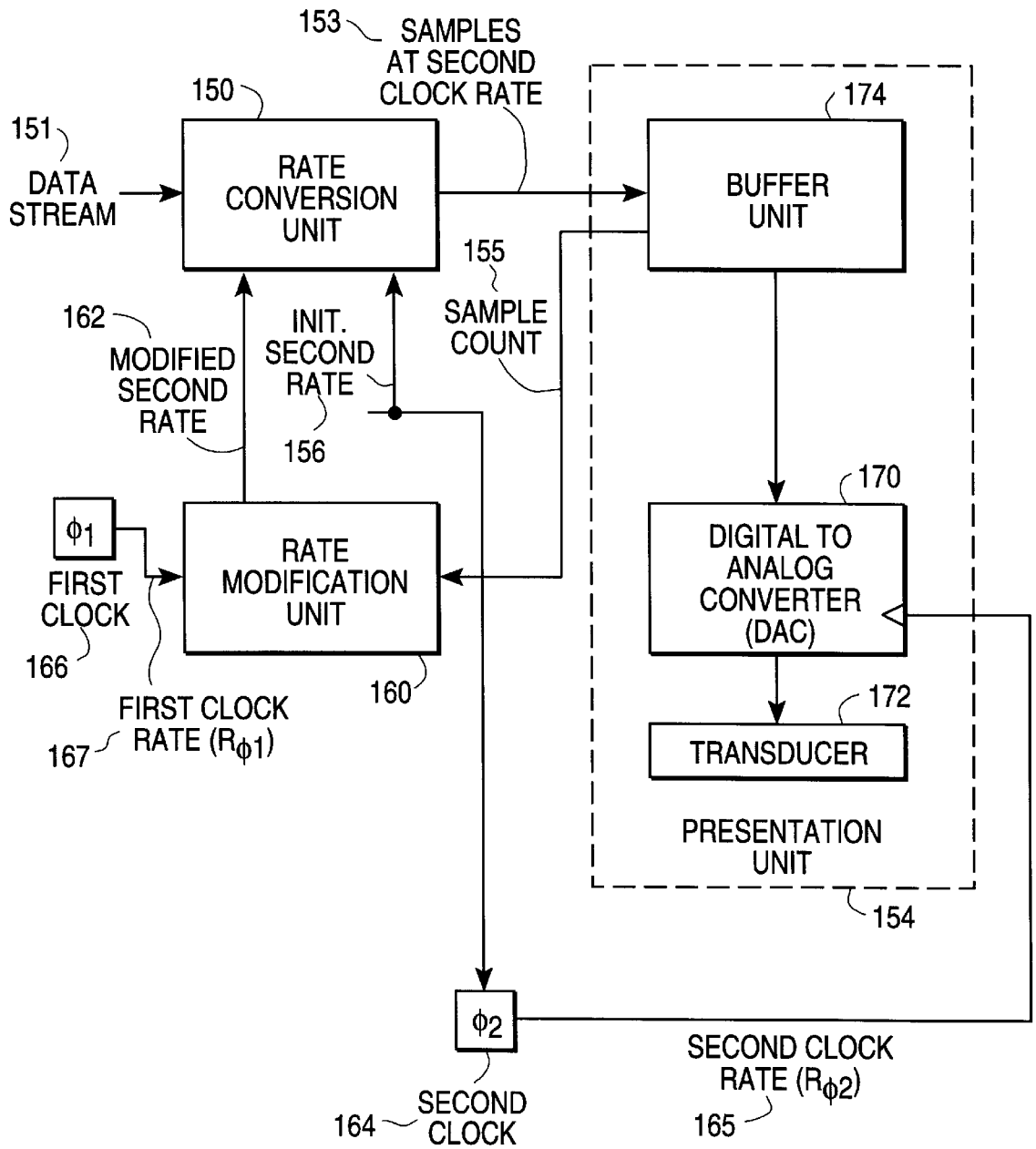
FIG. 8 illustrates an alternative embodiment of the present invention.
Figure 9:
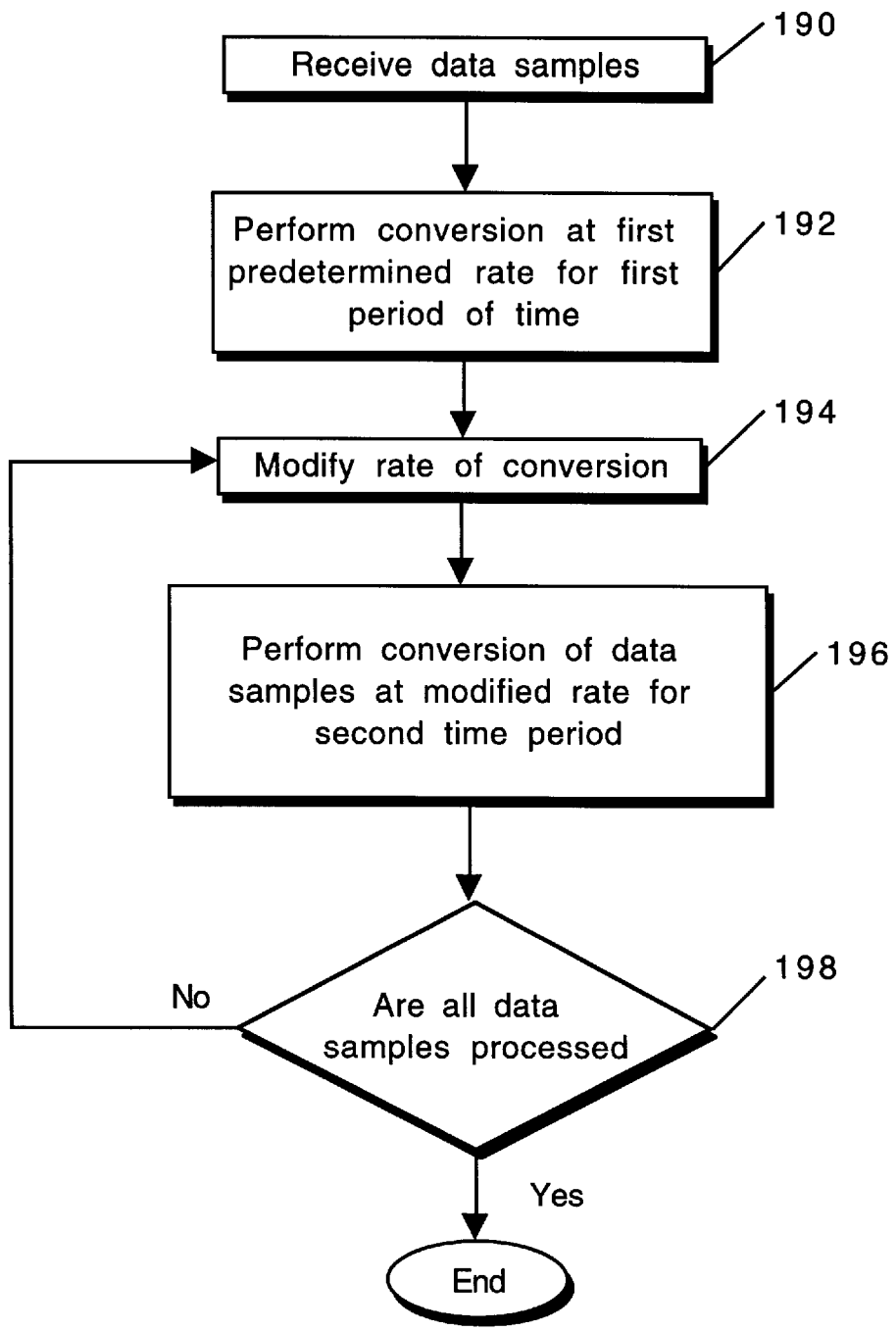
FIG. 9 illustrates the method steps of the present invention.

Instructions 101 is a plurality of processor executable instructions for instructing a computer system to synchronize the presentation of data in accordance with the embodiment of the present invention, as illustrated in FIG. 7. Instructions 102 is a plurality of processor executable instructions for instructing the computer system to synchronize the presentation of data in accordance with an alternative embodiment of the present invention, as illustrated in FIG. 8. Instructions 103 is a plurality of processor executable instructions for instructing the computer system to synchronize the presentation of data in accordance with the embodiment of the present invention, as illustrated in FIG. 9. Instructions 104 is a plurality of processor executable instructions for instructing the computer system to synchronize the presentation of data in accordance with the embodiment of the present invention, illustrated in FIGS. 11–13. Instructions 105 is a plurality of processor executable instructions for instructing the computer system to synchronize the presentation of data in accordance with the embodiment of the present invention, as illustrated in FIG. 15.

FIG. 7 illustrates one embodiment of the present invention. The present invention includes a rate conversion unit 150 that has a first input for receiving a datastream (hereinafter referred to as a media stream) at a media data sample rate 151 and a second input for receiving a modified second clock rate 162 (hereinafter defined).

The media stream has a plurality of media samples. The rate conversion unit 150 based on these two inputs, generates samples at a second clock rate 153.

The media samples at the media data sample rate 151 are provided by any digital media source (not shown). This digital media source may be a mass storage device 90, a memory 82, a network storage media 95, a capture device 92, or a network interface 96, of a computer system, as illustrated in FIG. 5. For example, the network storage media 95 may be a server presenting video on demand to the computer system.

Another example of a digital media source is another computer system that provides media via network interface 96 to the computer system, illustrated in FIG. 5, in a video conference environment.

A presentation unit 154 is coupled to the rate conversion unit 150. The presentation unit 154 includes hardware and/or software that presents media to an observer. The presentation unit 154 has a first input for receiving the samples at the second dock rate 153 and a second input for receiving the second clock rate 165 from a second dock 164. The presentation unit 154 also provides a sample count 155 to the rate modification unit 160 hereinafter described. Although the embodiments of the present invention, illustrated in FIGS. 7 and 8, are directed toward the presentation of audio media, and therefore illustrate a presentation unit 154 that includes a digital to analog converter (DAC) 170 and a transducer 172 (e.g., speaker) to present the audio media, the presentation unit 154 may include a variety of different hardware and software components for presenting a particular type of media. For example, the presentation unit for presenting video media may include a DAC, a display, and a graphics controller card. In an alternative embodiment, the presentation unit may include a device that uses digital information to present media to an observer. In such a case, a DAC 170 would not be required.

The present invention employs a rate converter to perform rate conversion of the digital samples. Rate conversion is simply changing the number of samples or creating a new set of samples, which interpolates between the prior set of samples (e.g., duplicating samples if the time period is stretched and interpolating values if the time period is constricted,) while not changing presentation with regard to real time.

Specifically, the rate conversion unit 150 transforms the samples in the media stream at a media data sample rate 151 into samples at a second clock rate 153. The media data sample rate is the rate at which the media is sampled. The media data sample rate is generally a reciprocal of the duration of each media sample, but need not be (e.g., Quicktime). If the media data sample rate is denoted $R_1$ and the second clock rate is denoted $R_2$, the rate conversion unit 150 may be represented as a transfer function equal to $R_2$ divided by $R_1$. For example, if the input samples 151 of the rate conversion unit 150 are at a 21,739 Hz clock rate, and the output samples 153 of the rate conversion unit 150 are at a 22,050 Hz clock rate, then the transfer function (i.e., ratio) is equal to 22,050 divided by 21,739. The rate conversion unit 150 is known in the art for converting samples at a first rate to samples at a second rate. For example, any digital interface between a CD-ROM player (e.g., 44,100 samples/sec) and a digital audio tape would employ a rate conversion unit to convert from the sample rate of the CD-ROM player to the sample rate of the digital audio tape (48,000 samples/sec).

Although ideally, the initial or programmed second clock rate 156 is identical to the frequency of the second clock 165, there is a difference between the programmed clock frequency for the second clock and the actual clock frequency of the second clock. In fact, as will be discussed later, the frequency of the second clock 165 may vary over time due to conditions such as changes in the temperature of the environment.

Accordingly, the present invention employs a rate modification unit 160 for dynamically modifying the second clock rate of the transfer function of the rate conversion unit 150 to detect and correct any error or difference between the programmed clock frequency 156 for the second clock 165 and the actual clock frequency of the second clock (e.g., audio clock of an audio subsystem).

The rate modification unit 160 has an input for receiving a frequency of a first clock rate 167 from a first clock 166 (e.g., a real time clock) and a second input for receiving a sample count from the presentation unit 154. The first clock rate 167 may be provided by a first clock 166 that is local to the presentation unit 154 (e.g., the local oscillator in the computer system. The first clock rate 167 may also be a clock rate that is corrected or synchronized to a remote reference via a network protocol. The use of a network synchronization protocol to synchronize and/or correct a first clock rate 167 from a local first dock 166, will be described in greater detail hereinafter. The first clock rate 167 may also be generated by a first clock 166 that is remote from the presentation unit 154. For example, in broadcast TV, the first dock rate 167 is provided by a first clock 166 disposed at the broadcast station, which is remote from the presentation unit 154.

In this particular embodiment, the sample count 155 comes from the DAC 170.

The sample count is simply the number of samples received by the DAC 170 from the rate conversion unit 150. The rate modification unit 160 provides a modified second clock rate 162, which modifies the conversion ratio of the rate conversion unit 150, based upon the sample count and the first clock.

The present invention makes an observation of the second clock frequency 165 (e.g., audio clock) to determine its frequency. The present invention employs a phased lock loop in software that is slaved to the second dock frequency (e.g., audio clock) and also implements a frequency counter for comparing the sample count to the dock frequency 167 of the first clock 166 (e.g., a real time clock).

FIG. 8 illustrates an alternative embodiment of the present invention. In this embodiment, the present invention includes a presentation unit 154 having a buffer unit 174. The buffer unit 174 is coupled to the rate conversion unit 150 for receiving the samples at the second clock rate 153. The buffer unit 174 provides the sample count 155 to the rate modification unit 160 and is also coupled to the DAC 170. As noted previously, the DAC 170 converts digital samples into analog waveforms.

In this embodiment, as in the embodiment shown in FIG. 7, an initial second rate 156 is provided to the rate conversion unit 150 and also to the second clock 164. This initial second rate 156 is used to program the second clock 164 associated with the conversion unit 158. Although FIGS. 7 and 8 show the same initial second rate 156 provided to the rate conversion unit 150 and also to program the second clock 164, it should be noted that the initial second rate presented to the rate conversion unit 150 may be different from the initial second rate 156 provided to program the second clock 164. For example, the initial second rate 156 provided to the rate conversion unit 150 may be 21739 Hz, whereas the value provided to program the second clock 164 may be 22050 Hz.

The buffer unit 174 may be implemented by a software buffer (hereinafter known as $Q_2$) that is coupled in series with a hardware FIFO buffer (hereinafter known as $Q_1$). In one embodiment, the software buffer is coupled directly to the rate conversion unit 150. The hardware FIFO buffer (typically 2 Kbytes in size) is coupled to the software buffer and to the conversion unit 158. The software buffer and the hardware buffer provide the rate modification unit 160 a sample count 155 of the number of samples received from the preceding functional unit. For example, the software queue provides a sample count to the rate modification unit 160 of a number of samples received from the rate conversion unit 150. The hardware queue provides a sample count to the rate modification unit 160 of a number of samples received from the software queue. Although the above-noted embodiments of the present invention employ two buffers, it will be understood by one skilled in the art that the buffer unit 174 may be implemented with any number of buffers, depending on the specific application needs.

Due to the inherent lack of precision of the sample count 155 provided by the buffer unit 154, which is caused by the size of the hardware queue used to implement the buffer unit 154, the present invention takes into account the latency between the time at which the samples at a second clock rate are generated by the rate conversion unit 150 and the time at which those samples reach the conversion unit 158.

Whereas FIG. 7 showed an embodiment of the present invention which there is no latency between the samples from the output of the rate conversion unit 150 to the input of the conversion unit 158, FIG. 8 illustrates an embodiment having a buffer unit 174 that introduces the above-noted latency.

In this embodiment and in the embodiment of FIG. 7, an initial second rate 156 is provided to the rate conversion unit 150 and the second clock 164.

As noted previously, although ideally, the initial or programmed second clock rate 156 is identical to the frequency of the second clock 165, there is a difference between the programmed clock frequency for the second clock and the actual clock frequency of the second clock.

Accordingly, the present invention employs a rate modification unit 160 for dynamically modifying the second clock rate of the transfer function of the rate conversion unit 150 to detect and correct any error or difference between the programmed clock frequency for the second clock 165 and the actual clock frequency of the second clock (e.g., audio clock of an audio subsystem).

In an alternative embodiment the present invention account, adjusts and compensates for clocks having a temperature dependence by implementing a time window (described hereinafter with reference to FIGS. 11–13). This time window detects changes of the clock frequency over time (e.g., due to temperature of the operating environment) so that the present invention may adjust the second clock rate 50 accordingly. The use of this time window will be described hereinafter in greater detail.

The present invention synchronizes the presentation of audio waveform to a clock having high precision (e.g., a real time dock) by determining what the sample rate of the audio clock is. Whereas the audio waveform is simply the analog waveform representing the tone or voice, the sample rate is the number of samples digitally sampled from one cycle of the corresponding analog waveform. For example, one second (i.e., 440 periods of an "A" tone of a waveform) sampled at 22,050 Hz generates 22,050 samples, whereas one second sampled at 21,739 Hz generates 21,739 samples. For example, the present invention may have input samples to the rate conversion unit having a 22,050 input sample rate and a D/A playback sample rate of 21,739 Hz.

A pitch problem is introduced when the input samples are at a rate of 21,739 Hz, and the playback rate is at 22,222 Hz. It is evident that the analog waveform associated with each of these different samples is different. In order to have the playback rate equivalent to the input rate, the samples of the playback rate must be stretched, which is an undesirable effect.

The term samples used in this application may refer to one or more bytes and is used to denote a unit of measuring the digital information.

Initially, the rate conversion unit 150 and the conversion unit 158 is provided with an initial rate of conversion 153 that may be selected from a number of different sources hereinafter described.

The rate modification unit 160 modifies the rate of conversion 162 and provides this modified rate of conversion 162 to the rate conversion unit 150 based upon the buffer count 155 and other relevant information (i.e., the elapsed time from $T_{rc}$, number of samples since $T_{rc}$ from the software queue ($Q_2$), and a damping coefficient ($\Delta T$ window great enough to slowly reduce the cumulative built-in error)).

FIG. 9 illustrates a flow chart illustrating the method steps of the present invention. The present invention receives data samples (e.g., video information or audio information) (processing step 190). Next, the present invention performs rate conversion at a predetermined rate for a period of time on some data samples (processing step 192). Next, the present invention modifies the rate of conversion (processing step 194). This step of modification will be described in greater detail hereinafter.

Next, the present invention performs rate conversion on the data samples at the modified rate for a second period of time (processing step 196). Next, the present invention determines whether there are further data samples to be processed (decision block 198). If so, the present invention goes to processing step 194. If all data samples are processed, the present invention ends its processing.

Figure 10:
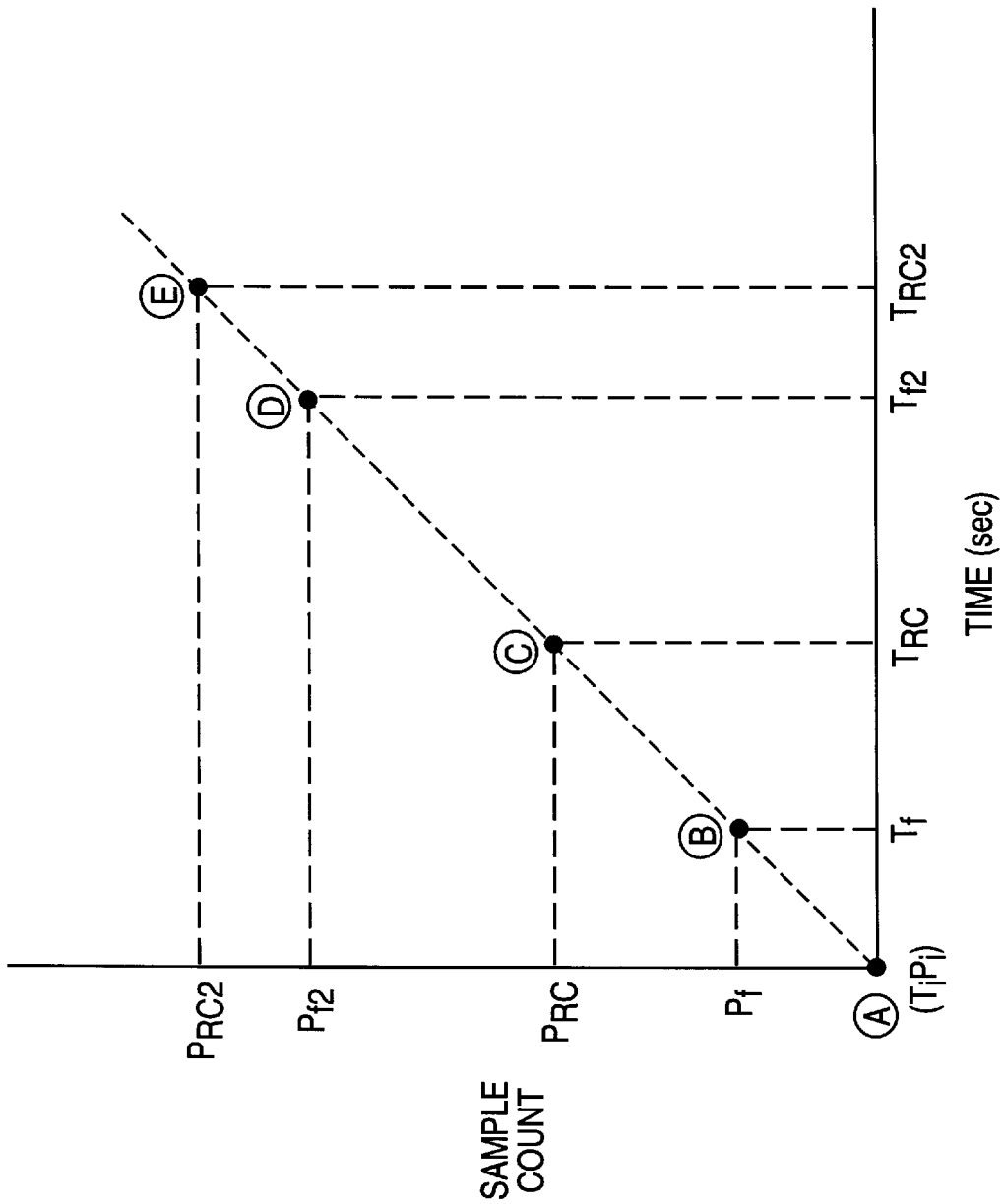
FIG. 10 illustrates a graph of the sample count versus time as it relates to the present invention.

FIG. 10 is a graph of the sample buffer count versus time that illustrates points A–E which are useful in understanding how the rate of conversion is modified.

Upon initialization, we are at point A ($T_i, P_i$). Although $T_i, P_i$ is at (0,0) in this graph, $T_i, P_i$ merely indicate a point at which both the time and the number of samples passed through/into the buffer are observed and known.

Point B (Tf,Pf) is the point at which a new rate of conversion is calculated. This rate of conversion is implemented at point C ($T_{rc}$, $P_{rc}$). Point D ($P_{f2}, T_{f2}$) is the second point at which the rate of conversion is calculated. Point E is the point at which the modified rate of conversion, calculated at point D, is implemented.

As will be noted, there is no predetermined time between the calculation of the modified rate and the implementation of that modified rate, nor is there a predetermined time between the calculations of the next modified rate, nor the implementation of those rates. Moreover, although a modified rate of conversion is calculated, the rate of conversion itself may not change from one ($T_f, P_f$) point to another.

With respect to the time between the $T_{rc}$ and $T_{f2}$ points, there is a minimum time to prevent noticeable jitter (e.g., warbling) related to the size of the buffer. In other words, the minimum time between $T_{rc}$ and $T_{f2}$ is determined empirically to avoid distracting the observer of the presentation.

FIG. 11, 12, and 13 are flow charts illustrating the steps of one embodiment of the present invention. First, the present invention initializes the relevant variables (processing step 280). For example, an initial rate of conversion ($R_i$) may be selected from the following: 1) a rate of conversion from a previously played movie, which is stored in a particular file; 2) a rate of conversion provided by the audio subsystem (e.g., a sound card); and 3) a rate of conversion provided from a database having predetermined rates of conversion that correspond to various audio hardware configurations. Other initial conditions include the initial time and sample count ($T_i, P_i$).

Next, the present invention observes and records the present sample count ($P_{now}$) (processing step 290). Then, the present invention observes and records the present time ($T_{now}$) (processing step 292).

Next, the present invention determines if the elapsed time ($T_{now}$-$T_{rc}$) is greater than a first predetermined value (decision block 296). This first predetermined value is a minimum time before the following steps are performed. If yes, processing continues to processing step 302. If no, the processing continues to processing step 298.

Next, the present invention calculates the expected number of samples ($P_{cr}$) presented (e.g., played back) since the conversion rate was modified last (processing step 302). The expected number of samples ($P_{cr}$) is calculated by multiplying the current rate of conversion ($R_n$) with the difference of $T_{now}$ and $T_{rc}$. In other words, the expected number of samples ($P_{cr}$) is the product of the previously calculated rate of conversion ($R_n$) multiplied by the time elapsed from $T_{rc}$ to $T_{now}$. $T_{now}$ is simply a point in time arbitrarily chosen as a reference point for the following calculations. $T_{rc}$ is simply the time at which the last sample is presented at a previous rate before the modified rate is implemented.

Next, the present invention determines $P_{ex}$, which is simply the sum of $P_{cr}$ and $P_{rc}$ (hereinafter defined as processing step 303).

Next, the present invention calculates the sample error (processing step 308).

The sample error is simply the difference between the $P_{ex}$ and $P_{now}$. As noted previously, $P_{now}$ is simply the count of the number of samples passed into $Q_1$ (the hardware FIFO buffer) at $T_{now}$.

Steps 280–308 may be practiced and performed by a software driver disposed on a computer readable medium.

Next, the present invention determines whether or not the sample error, calculated in processing step 308, is greater in magnitude than a predetermined threshold value (decision block 316). If not, the processing continues to processing step 298. If so, the present invention estimates the current rate of conversion $R_{now}$ (processing step 318). $R_{now}$ is simply the quotient of the difference of $T_{now}$ minus $T_b$ and the difference of $P_{now}$ minus P. The $T_b$ and $P_b$ values, which will be defined hereinafter, are used to establish a window of a predetermined length of time (e.g., less than or equal to one minute) of previous rate estimates. The time period for the window is selected to control the error in the estimated rate ($R_{now}$). For example, if the data rate is 100,000 bytes per second, and the window is of a one minute duration, the error in the rate estimate is simply (100,000×60) divided by the buffer size (e.g., 2K).

This expression evaluates to approximately 1 out of 3,000 as an error in the rate estimate ($R_{now}$)

Next, the present invention calculates the rate correction (i.e., how much to correct the rate by) (processing step 326). The rate correction is simply the sample error (308) divided by a predetermined damping coefficient. Empirically, applicant has found a damping coefficient of 30 seconds to work well for certain applications. A damping coefficient that is too high or too low may cause perceptible jitter and/or warbling in the presentation of the data.

Next, the present invention calculates a new rate ($R_{(n+1)}$) (processing step 328).

$R_{(n+1)}$ is simply the difference between $R_{now}$ and the rate correction calculated in processing step 326. $R_{now}$ is simply the observed rate, since it is directly derived from observed values (i.e., the change of the sample count/change in time, processing step 318). The rate correction compensates the rate by overshooting the ideal rate (i.e., it presents the rate from becoming asymptotically approximate to the ideal rate), to prevent accumulations of latency due to previously incorrect rate conversions.

Next, the present invention determines whether or not the new rate $R_{(n+1)}$ is equal to the old rate ($R_n$) (decision block 334). If yes, the processing goes to processing step 380, illustrated in FIG. 13. If no, the modified sample rate, $R_{(n+1)}$ is provided to the rate conversion unit (processing step 336). In processing step 348 the present invention determines $T_{rc}$ (n+1), the time at which $R_{n+1}$ is implemented. In processing step 354, present invention determines Prc(n+1), the sample count when $_{Rn+1}$ is implemented. Specifically, the following equations are used in processing steps 348 and 354:

$$P_{rc\ (n+1)} = P_{rc\ (n)} + S_{Q2}$$

$$T_{rc(n+1)} = T_{rc(n)} + S_{Q2}/R_n$$

$S_{Q2}$ is simply the number of samples queued in the software queue since the previous $T_{rc}$ at the rate correction of $R_n$.

In the embodiment of the present invention which employs a buffer, steps 348 and 354 are important. Steps 348 and 354 account for the latency between the time a sample is presented to the buffer from the rate conversion unit and the time the sample is actually presented (e.g., played through the conversion means (e.g., DAC)).

$P_{rc}$ is simply the number of samples passed into the buffer and is a measure of the number of samples provided to the buffer by the rate conversion unit. Since the buffer may be implemented with a number of queues (e.g., a software queue followed by a hardware queue), Prc represents the number of samples inputted into the first buffer coupled to the rate conversion unit. If there is a software queue immediately following the rate conversion unit, and the software queue is followed by a hardware queue, the difference between the number of samples inputted into the hardware queue minus the number of samples inputted into the software queue from the rate conversion unit represents the latency injected through the use of the software queue. Similarly, the difference between the number of samples inputted into the DAC minus the number of samples inputted into the hardware queue represents the latency injected into the system due to the hardware queue.

After step 354, the present invention initializes $S_{Q2}$ (not shown as a step in FIG. 12)). $S_{Q2}$ is updated as the samples pass into the first buffer (e.g, the software buffer Q2) after the rate conversion unit.

In processing step 356, $P_{rc}$, $T_{rc}$, and $R_n$ are assigned the values of $P_{rc}$(n+1), $T_{rc}$(n+1), and $R_{n+1}$.

Next, the present invention updates $R_n$ (processing step 362). $R_n$ is simply assigned the new rate ($R_{(n+1)}$).

In decision block 380, the present invention determines whether or not $T_{now}$-$T_b$ is greater than a predetermined number (e.g., thirty seconds). If no, the processing returns to processing step 298. If yes, the present invention updates $T_b$ (processing step 384). $T_b$ is assigned a value of $T_{nb}$. Next, the present invention updates $P_b$ (processing step 392). $P_b$ is assigned a value of $P_{nb}$. Next, the present invention updates $T_{nb}$ (processing step 394). $T_{nb}$ is assigned the value of $T_{now}$. Next, the present invention updates $P_{nb}$ with $P_{now}$ (processing step 398).

Steps 380 through 398 implement the two sliding windows of the present invention. First, a determination is made whether the difference between $T_{now}$-$T_b$ is greater than a predetermined value. If yes, the $T_b$ is updated with $T_{nb}$. $P_b$ is updated with $P_{nb}$. $P_{nb}$ is updated with $T_{now}$, and $P_{nb}$ is updated with $P_{now}$. $T_b$ and $P_b$ establish a baseline reference of previously calculated rates. For example, after the present invention has been executing for a period of time, the length of the sliding window is between 30 to 60 seconds in length. Initially, because there is no history of previously calculated rates, the length of the sliding time window is considerably less than 30seconds (e.g., 0 upon startup of this program).

$P_{nb}$ and $T_{nb}$ specify a smaller time window that represents previously calculated rates. This partial time window becomes the sliding time window when $T_{now}$-$T_b$ is greater than a third predetermined value.

Next, the processing returns to processing step 298.

Please note that at decision block 334, if the determination is a 'yes', the processing flows to decision block 380, as noted in the figures.

It should be noted that the steps 296, 298, 334, 348, 354, 356 and 380 through 398 are optional steps that may be omitted in alternative embodiments of the present invention. For example, in the embodiment of the present invention shown in FIG. 7, processing steps 348 through 356 are not required because there is not buffer latency to account for. Moreover, the teachings of the present invention may be implemented with alternative sequence of the steps noted in FIGS. 11–13.

The prior art approaches to audio information and video information synchronization have at least these two problems. First, there is a pitch problem in audio samples in that the audio clock on an audio subsystem does not agree with the real time clock over a period of time. Thus, the pitch of the audio tones and on notes does not stay in tune over time. Second, a "queuing problem" is injected into the system when audio and/or video information is sent between two devices on a network (conferencing/server applications). For example, if a digital media presentation device is presenting information at 21.5 KH, and a source is capturing or sending (source); the information at 22.5 KH, the presentation device will be behind by about three seconds of playback for every one minute of playback time. This problem becomes pronounced when there is one digital media source broadcasting information (e.g., video) which does not stop sending information. For example, in a video on demand system, the digital media presentation device will have a queuing problem, either too much data if the digital media presentation device are operating at a lower frequency than the transmitting work station, or it will be starved for data in the case where the receiving presentation is greater than the transmission frequency.

Figure 14:
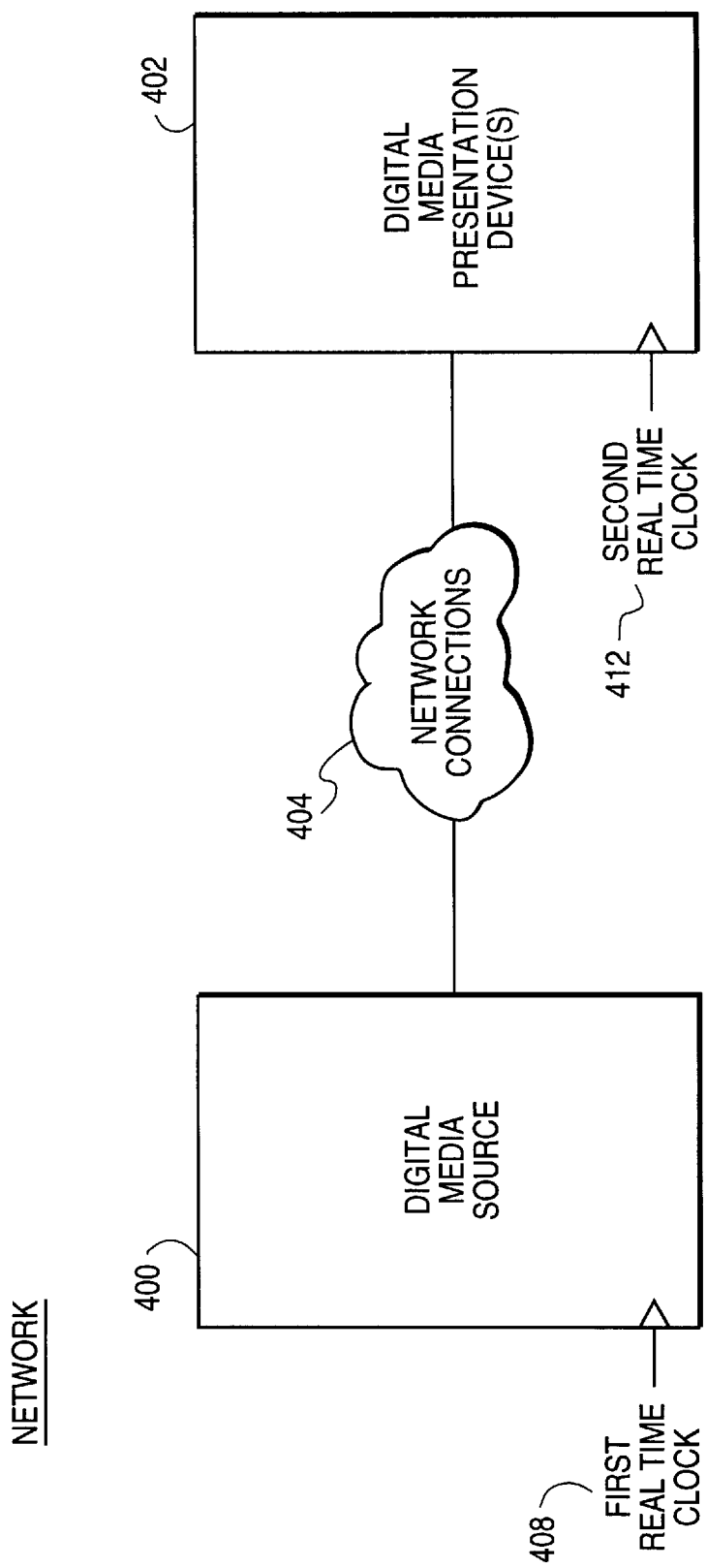
FIG. 14 illustrates a network including a digital media source and a media presentation device in which the present invention may be implemented.

FIG. 14 illustrates a network in which the present invention may be implemented. The network includes a digital media source 400 that is coupled to a digital media presentation device 402 via network connections 404. The digital media source 400 provides digital media to other devices (e.g., 401) in the network. A digital media source encompasses any device that provides media information. For example, the digital media source 400 may be a server that includes a database of information, accessible by the digital media presentation devices 402. The digital media source 400 may also be a computer system, as illustrated in FIG. 5, that provides media information to the digital media presentation device 402 in a video conference environment. Another example of a digital media source 400 is a device for capturing live video or audio (e.g., a video camera or microphone).

The digital media presentation devices 402 is any device in which the presentation of media occurs. The digital media presentation device 402 may be another computer system, as illustrated in FIG. 5, for receiving information in a video conference environment. Another example of a digital media presentation device 402 that presents media is a video phone appliance.

In a network having at least two devices, there is an issue of how to synchronize the real time clocks of the two devices. This problem of synchronizing the real time clocks of one device (e.g., source) to the real time clock of another device (e.g, presentation device) across a network is well known in the art. In fact, a synchronization protocol, such as the NTP (network time protocol), is a software solution to correcting observed errors in synchronization between two devices on a network. Essentially, the network time protocol is a software implementation of a phased lock loop (PLL) between the networked devices.

FIG. 15 is a flowchart illustrating the steps of the present invention as implemented in a network, as illustrated in FIG. 14. First, the digital media source sends a data stream over the network to the digital media presentation device (or devices) (processing step 440). In processing step 442, the present invention uses the NTP, or other similar protocol, to synchronize the real time clocks of the media source and the presentation devices. In processing step 444, the present invention synchronizes the media presentation with dynamic rate conversion to the real time clocks of the source and presentation devices. In step 448, the data samples are played back on the digital media presentation devices. This sequence of steps ends when processing for the data stream is complete.

Although steps 440 through 448 are shown as sequential steps in FIG. 15, please note that steps 440 through 448 may be and typically are parallel processes.

The digital media source 400 has an input for receiving a first real time clock 408. The digital media presentation device 402 has an input for receiving a second real time clock 412.

Accordingly, a robust method and apparatus for synchronizing audio and video data to real time that operates even with very imprecise audio clocks (e.g., RC circuits having a great temperature variance) has been disclosed. The present invention modifies the rate of conversion of the audio data as the audio data is presented (e.g., played-back). Moreover, the present invention slaves the audio playback waveform to a real time dock without reprogramming the DAC. The present invention may be viewed on a high level as a software implementation of a phased locked loop which locks the observed audio clock rate of the audio subsystem to the actual frequency of the audio clock, allowing precise rate conversion of media data from a data stream to a presentation synchronized with a real time clock.

The present method and apparatus for synchronization takes into account and appropriately adjusts for the following factors. First, there already exists data in the playback buffers (e.g., hardware and software queues) which ideally should be corrected to the observed rate, although in fact the samples in the hardware queue and the software queue cannot be recovered and manipulated. A second factor is that the audio clock rate may be variable (e.g., temperature variations). Although the prior art approaches assume that the audio clock rate was constant with regard to real time, in fact, the audio clock rate is variable. The present invention accounts for this factor by keeping a time window (e.g., one minute in duration) of past audio frequency playback observations. A short time window of ten seconds of observations is not accurate in that there will be an inherent error due to the size of the 2K buffer.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A method for synchronizing a presentation of a data stream to a first clock having a first frequency, said data stream having a plurality of data values, said method comprising the steps of:
   a) performing a rate conversion on said data stream during a first time period, said rate conversion being a first predetermined rate of conversion;
   b) modifying the first predetermined rate of conversion to provide a modified rate of conversion for said synchronizing of the presentation of said data stream, wherein said first determined rate of conversion is modified based on a measurement of a difference between a rate of said first clock having a first frequency and a rate of a second clock having a second frequency, wherein said second clock is an audio clock of an audio subsystem; and
   c) performing a rate conversion with the modified rate of conversion on the data stream for a second time period.

2. The method for synchronizing the presentation of a data stream as set forth in claim 1, further comprising the step of repeating the step of modifying the first predetermined rate of conversion to provide a modified rate of conversion and the step of performing the rate conversion with the modified rate of conversion until all data values in the data stream are processed.

3. The method for synchronizing the presentation of a data stream as set forth in claim 1, wherein said first clock is a real time clock of a computer system.

4. The method of synchronizing a data stream as set forth in claim 2, wherein the data stream is received from a network port, said network port providing audio information.

5. The method of synchronizing a data stream as set forth in claim 2, wherein the data stream is received from a network port, said network port providing video information.

6. The method of synchronizing a data stream as set forth in claim 2, wherein the data stream is received from a network port, said network port providing audio and video information.

7. The method of synchronizing a data stream as set forth in claim 2, wherein the data stream is received from a network port, said network port providing a shared environment.

8. The method of synchronizing a data stream as set forth in claim 2, wherein the data stream is received from a storage medium, said storage medium providing audio information.

9. The method of synchronizing a data stream as set forth in claim 2, wherein the data stream is received from a storage medium, said storage medium providing video information.

10. The method of synchronizing a data stream as set forth in claim 2, wherein the data stream is received from a storage medium, said storage medium providing audio and video information.

11. The method of synchronizing a data stream as set forth in claim 2, wherein the data stream is received from a storage medium, said storage medium providing a plurality of different media.

12. An apparatus for synchronizing the presentation of a data stream to a first clock having a first frequency, said data stream having a plurality of samples, said apparatus comprising:

a) a first logic circuit having an input for receiving a data stream, said first logic circuit for performing rate conversion on the data stream at a first rate of conversion for a first period of time;

b) a digital to analog conversion circuit, coupled to the first logic circuit, for converting the samples into analog waveforms at a second rate of conversion; and c) a second logic circuit, coupled to a first clock having a first frequency, the digital to analog converter and the first logic circuit, said second logic circuit receiving a first value from the digital to analog converter, said value representing the number of samples played through the conversion circuit at any given time and based on the first value modifying the rate of conversion to provide a modified rate of conversion, wherein said rate of conversion is modified based on a measurement of a difference between a rate for the first clock having a first frequency and a rate of a second clock having a second frequency, wherein said second clock is an audio clock of an audio subsystem.

13. The apparatus for synchronizing the presentation of a data stream as set forth in claim 12, wherein the first logic circuit performs the rate of conversion on the data stream for a second period of time using the modified rate of conversion.

14. The apparatus for synchronizing the presentation of a data stream as set forth in claim 12, wherein the first clock is a real time clock of a computer system.

15. An apparatus for synchronizing a data stream as set forth in claim 13, wherein the data stream is received from a network port, said network port providing audio information.

16. An apparatus for synchronizing a data stream as set forth in claim 13, wherein the data stream is received from a network port, said network port providing video information.

17. An apparatus for synchronizing a data stream as set forth in claim 13, wherein the data stream is received from a network port, said network port providing audio and video information.

18. An apparatus for synchronizing a data stream as set forth in claim 13, wherein the data stream is received from a network port, said network port providing a shared environment.

19. An apparatus for synchronizing a data stream as set forth in claim 13, wherein the data stream is received from a storage medium, said storage medium providing audio information.

20. An apparatus for synchronizing a data stream as set forth in claim 13, wherein the data stream is received from a storage medium, said storage medium providing video information.

21. An apparatus for synchronizing a data stream as set forth in claim 13, wherein the data stream is received from a storage medium, said storage medium providing audio and video information.

22. An apparatus for synchronizing a data stream as set forth in claim 13, wherein the data stream is received from a storage medium, said storage medium providing a plurality of different media.

23. An apparatus for synchronizing the presentation of a data stream, said data stream having a plurality of samples, said apparatus comprising:

a) first logic circuit having an input for receiving the data stream, said first logic circuit for performing rate conversion on the data stream at a first rate of conversion for a first period of time;

b) a data buffer, coupled to the first logic circuit, for storing data values;

c) a conversion circuit, coupled to the data buffer for converting the samples into analog waveforms at a second rate of conversion; and d) a second logic circuit, coupled to a first clock having a first frequency and the data buffer, and the first logic circuit, said second logic circuit receiving a first value representing the number of samples stored in the data buffer at any given time and based on the first value modifying the rate of conversion of the first logic circuit to provide a modified rate of conversion to the first logic circuit, wherein said rate of conversion is modified based on a measurement of a difference between a rate for the first clock having a first frequency and a rate of a second clock having a second frequency, wherein said second clock of a second frequency is an audio clock of an audio subsystem.

24. The apparatus for synchronizing the presentation of a data stream as set forth in claim 23, wherein the first logic circuit performs the rate of conversion on the data stream for a second period of time using the modified rate of conversion.

25. The apparatus for synchronizing the presentation of a data stream as set forth in claim 23, wherein the clock having the first frequency is a real time clock of a computer system.

26. In a computer system having a digital media source connected with a digital media presentation device, the digital media source and the digital media presentation device each having a first and second clock, a method for synchronizing the presentation of a data stream sent by the digital media source to the digital media presentation device comprising the steps of:

a) said digital media presentation device receiving the stream of data;

b) synchronizing the first clocks of the digital media source and the digital media presentation device via a synchronization protocol;

c) synchronizing the presentation of the data using the second clock of the digital media presentation device to the first clock of the digital media presentation device by performing the following i) performing a rate conversion of said data stream for a first period of time, said rate conversion having a first rate of conversion;

ii) modifying the first rate of conversion to provide a modified rate of conversion, wherein said rate of conversion is modified based on a measurement of a difference between a rate for the first clock having a first frequency and a rate of the second clock having a second frequency, wherein said second clock of a second frequency is an audio clock of an audio subsystem in the workstation; and iii) performing a rate conversion on said data stream with the modified rate of conversion for a second period of time.

27. The method for synchronizing the presentation of a data stream as set forth in claim 26, further comprising the step of repeating the step of modifying the first predetermined rate of conversion to provide a modified rate of conversion and the step of performing the rate conversion with the modified rate of conversion until all data values in the data stream are processed.

28. The method of synchronizing the presentation of a data stream as set forth in claim 26, wherein the clock having the first frequency is a real time clock of the workstation.

29. The method of synchronizing a data stream as set forth in claim 26, wherein the data stream represents audio information.

30. The method of synchronizing a data stream as set forth in claim 26, wherein the data stream comprises video information.

31. The method of synchronizing a data stream as set forth in claim 26, wherein the data stream comprises video and audio information.

32. An apparatus for synchronizing the presentation of a data stream, said data stream having a plurality of samples, said apparatus comprising:
   a) first logic circuit having an input for receiving a data stream, said first logic circuit for performing rate conversion on the data stream at a first rate of conversion for a first period of time;
   b) a conversion means, coupled to the first logic means for converting the samples into analog waveforms at a second rate of conversion; and
   c) a second logic means coupled to a first clock having a first frequency and the first logic means, said second logic means having an input for receiving a first value, said first value representing the number of samples played through the conversion means at any given time and based on the first value modifying the rate of conversion to provide a modified rate of conversion, wherein said rate of conversion is modified based on a measurement of a difference between a rate for the first clock having a first frequency and a rate of a second clock having a second frequency, wherein said second clock is an audio clock of an audio subsystem.

33. The apparatus for synchronizing the presentation of a data stream, as set forth in claim 32, wherein the first logic means performs the rate of conversion on the data stream for a second period of time using the modified rate of conversion.

34. The apparatus for synchronizing the presentation of a data stream, as set forth in claim 32, wherein the first clock is a real time clock of a computer system.

35. An apparatus for synchronizing the presentation of a media steam, said media stream having a plurality of media samples, to a first clock rate, said apparatus comprising:
   a rate conversion unit for receiving a media stream and performing rate conversion on the media stream for a first period of time;
   a presentation unit, coupled to the rate conversion unit, said presentation unit including a first input for receiving a second clock rate, said presentation unit presenting the media to an observer;
   a rate modification unit, coupled to the rate conversion unit and the presentation unit, said rate modification unit including a first input for receiving a sample count from the presentation unit, said sample count representing the number of samples presented to the observer, and a second input for receiving the first clock rate, said rate modification unit, in response to the sample count and the first clock rate, generating a modified second clock rate and providing the modified second clock rate to the rate conversion unit, wherein said second clock rate is for an audio subsystem.

36. The apparatus as set forth in claim 35 wherein the rate conversion unit, upon receipt of the modified second clock rate, performs rate conversion on the media stream for a second period of time with the modified second clock rate.

37. The apparatus as set forth in claim 35 wherein the media stream includes a plurality of media type with each media type having its own rate conversion unit, presentation unit, and rate modification unit; and
   wherein the rate modification of each media includes an input for receiving the first clock rate and the presentation unit of each media includes an input for receiving the second clock rate.

38. The apparatus as set forth in claim 37 wherein the second clock rate of each presentation unit of each media is different.

39. The apparatus as set forth in claim 38 wherein the first clock rate for each rate modification unit for each media is the same time reference.

* * * * *